US008708547B2

(12) United States Patent
Bilger

(10) Patent No.: US 8,708,547 B2
(45) Date of Patent: Apr. 29, 2014

(54) SYSTEM AND PROCESS FOR INTRODUCING A RIGID LANCE INTO A CONCRETE MIXING TRUCK USING AN ARTICULATED ARM

(75) Inventor: Stephen Bilger, Houston, TX (US)

(73) Assignee: Air Liquide Industrial U.S. LP, Houston, TX (US)

(*) Notice: Subject to any disclaimer, the term of this patent is extended or adjusted under 35 U.S.C. 154(b) by 1161 days.

(21) Appl. No.: 12/254,098

(22) Filed: Oct. 20, 2008

(65) Prior Publication Data
US 2009/0103392 A1   Apr. 23, 2009

Related U.S. Application Data

(60) Provisional application No. 60/981,646, filed on Oct. 22, 2007.

(51) Int. Cl.
*B28C 5/06* (2006.01)

(52) U.S. Cl.
USPC ...................... 366/4; 366/7; 366/12; 366/105

(58) Field of Classification Search
USPC .............................................. 366/4, 7, 12, 105
See application file for complete search history.

(56) References Cited

U.S. PATENT DOCUMENTS

| 5,806,245 A * | 9/1998 | Satrom ........................... 49/360 |
| 2007/0171764 A1 | 7/2007 | Klein | |

FOREIGN PATENT DOCUMENTS

| GB | 2106887 | 4/1983 |
| JP | 61229506 | 10/1986 |
| JP | 62150110 | 9/1987 |
| JP | 01120304 | 5/1989 |
| JP | 06270128 | 9/1994 |
| WO | 03061925 | 7/2003 |
| WO | WO2006100550 | * 9/2006 |

OTHER PUBLICATIONS

Written Opinion for Singapore application No. 201002701-9, mailed Jun. 9, 2011, 5 pgs.
Coolcrete Drive Thru Unit, Model 2700B, Instruction for Installation and Operation, Airco Industrial Gases, 151 pages.
Search Report for PCT/US2008/080450.

* cited by examiner

*Primary Examiner* — Yogendra Gupta
*Assistant Examiner* — Robert J Grun
(74) *Attorney, Agent, or Firm* — Elwood L. Haynes

(57) ABSTRACT

A present invention provides for a system (100) for injecting cooling fluid into a concrete mixing container (502), the system (100) comprising a support structure (116) having a leg assembly with two or more supporting legs (201) and a cross member beam (200) supported between said two or more legs (201), the two or more legs (201) and the cross member beam (200) being positioned with respect to one another in such a manner as to define a passageway (210) of sufficient height (H) and width (W) between the two or more legs (201) and beneath the cross member beam (200) to allow passage of a concrete mixer truck (504) through the passageway (210) and a lance device (190) positioned on the cross member beam (200) of the support structure (116), the lance device (190) comprising an articulated arm that includes a rigid lance (102) which allows for the flow of a cooling fluid there through; and a means for acting on the articulated arm to cause pivotal movement of the articulated arm in a non-linear motion thereby controlling the angle of the rigid lance (102) while at the same time controlling the insertion and retraction movement of the rigid lance (102) into the concrete mixing container (502) for fluid injection of the cooling fluid into the concrete mixing container (502). The present invention further comprises a process for injecting cooling fluid into a concrete mixing container (502).

22 Claims, 14 Drawing Sheets

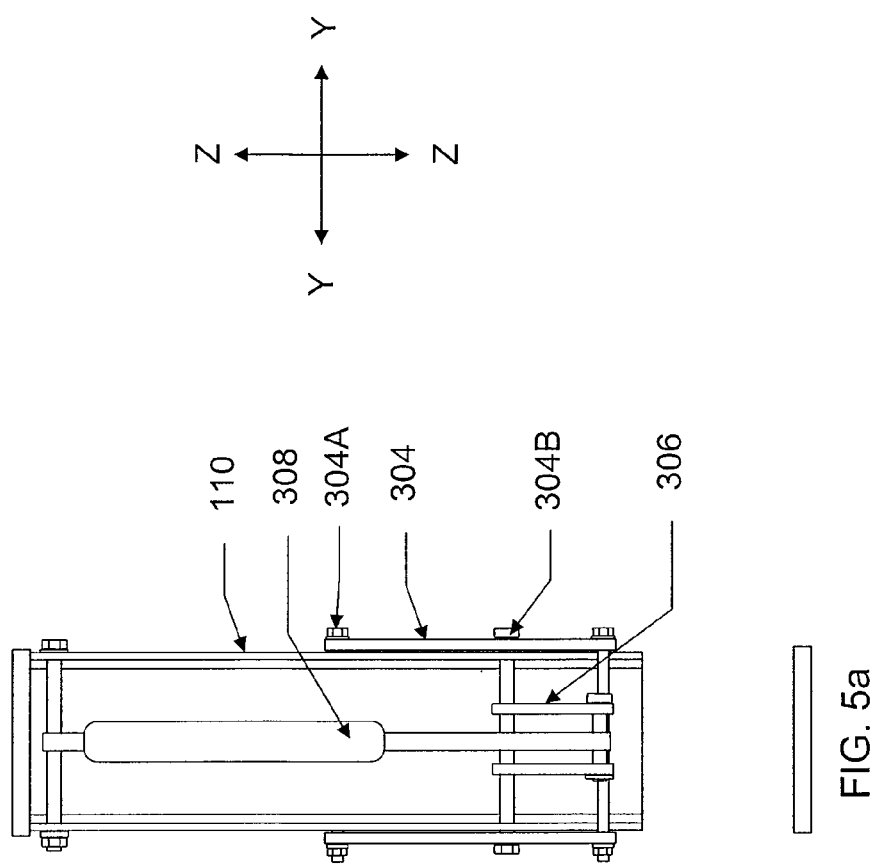

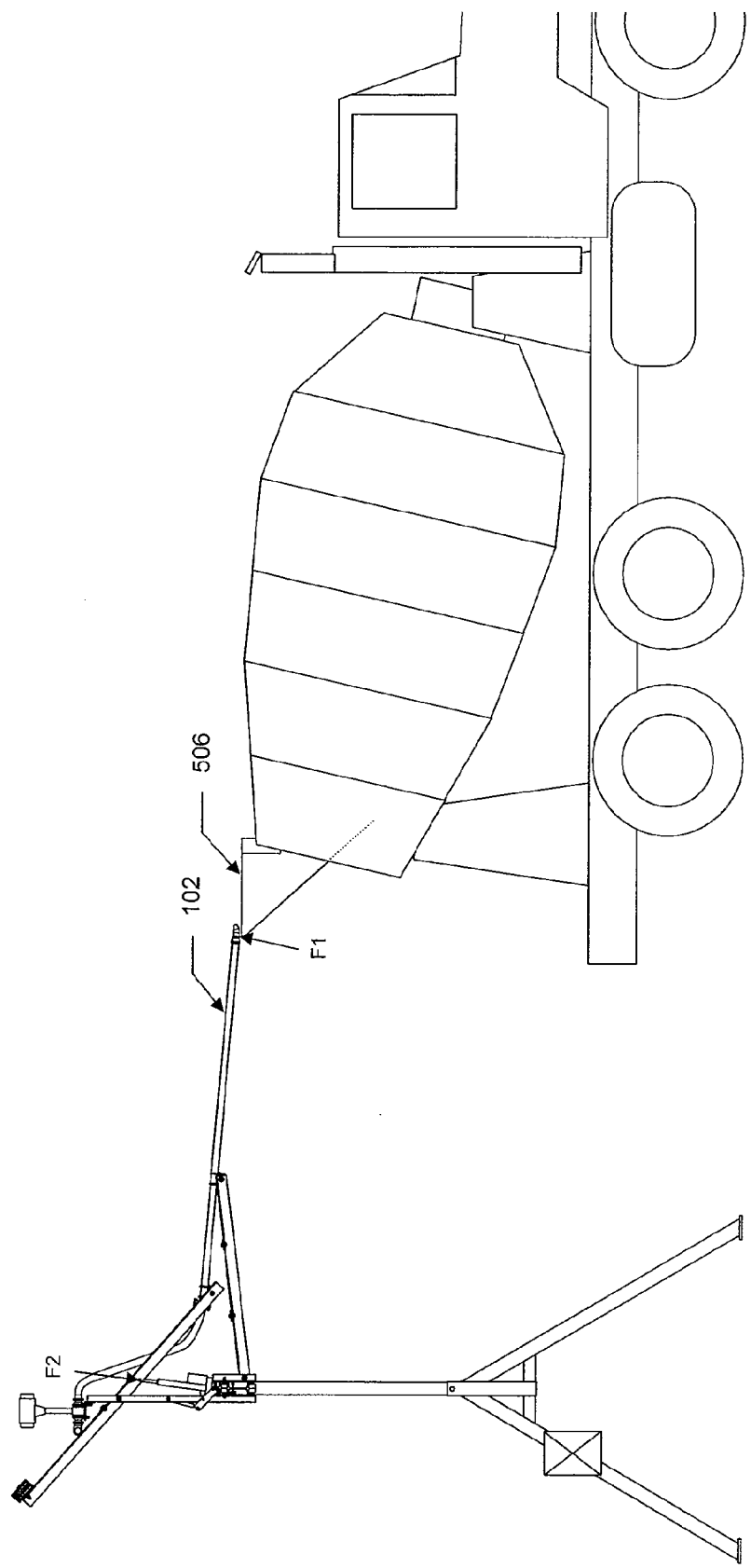

SYSTEM AND PROCESS FOR INTRODUCING A RIGID LANCE INTO A CONCRETE MIXING TRUCK USING AN ARTICULATED ARM

FIELD OF THE INVENTION

The present invention relates to an apparatus and process for injecting a cooling fluid into a concrete mixing container utilizing a system which includes a lance device having an articulated arm.

BACKGROUND

The state of the art for cryogenic concrete cooling is well documented in WO 2006/100550 as filed by Air Liquide. As noted in WO 2006/100550, when preparing concrete it is often necessary to cool the concrete mix since the structural integrity of the resulting concrete is dependent upon the temperature at which the concrete is set. Typically, the cooler the concrete when poured, the stronger it will be once it is set. Concrete that is poured at high temperatures will often not meet the minimum strength requirements, especially in warm weather climates.

In the past, this issue was addressed in a number of ways including 1) cooling the water used in mixing the concrete using a refrigeration unit, ice, or a cryogenic liquid which was mixed with the water before mixing the concrete and 2) injecting a cryogenic liquid directly into a concrete mixer drum of a truck while it is being mixed in a conventional rotating mixer. The first approach was found to present problems in terms of cost, timeliness, labor intensity, additional equipment, safety issue and final product issues. The second approach was found to present problems because of potential damage to the truck mixer drum.

Furthermore, the prior art systems basically fall into one of two main categories: those that are manually operated and those that are automated. Each has its own advantages and disadvantages with regards to fabrication cost, fabrication time, set-up/breakdown difficulty, operation (achievable productivity, safety, required training, ease of use, etc.), maintenance, storage, useful life, etc. The manually intensive systems are typically lower in cost, but are less productive and less safe. These systems involve manually positioning and clamping a lance to the concrete mixing drum before allowing the cryogenic liquid (e.g., nitrogen) to flow. Once the cooling process is complete, it is necessary to then unclamp and remove the lance, once again by hand. The highly automated systems are more productive and safer to operate, but they have a higher cost to manufacture and maintain. With these systems, the positioning and cryogenic liquid flow is controlled with various electric and/or pneumatic actuators so that no manual intervention is required.

While multiple prior art systems have sought to overcome the issues associated with these systems by providing relatively inexpensive systems that adjust to accommodate the relative position and particular specifications of a given container without so much manual intervention, there are still problems with these systems. For example, systems such as those disclosed in WO 2006/100550 use pneumatic cylinders to control the lance insertion and retraction due to the required length of travel of about five (5) feet or more. The cylinder can be controlled to either fully extend or to either fully retract, but are not capable of partially extending/retracting. Once the signal to extend the lance is given, the operator can only stop the lance by activating an emergency stop. If the lance or truck is positioned in a way so as to introduce a collision hazard, the operator often does not have enough time to react to prevent a collision. This collision often results in lance or mixer damage and often causes the lance to detach from the pneumatic cylinder. When the lance is detached, it must be manually returned to its proper position which results in significant down time. The practice of returning the lance to its original position is complicated since it often requires additional manpower and equipment to complete the task.

Also, while systems such as those disclosed in WO 2006/100550 do disclose a system that provides a lance that is capable of movement with a certain degree of freedom, such freedom is accomplished through the use of multiple actuators that act on the lance which must be coordinated in their workings in order to provide the degree of movement necessary without harming the lance and/or the mixer drum.

Accordingly, there exits a need for a system that includes the benefits of fully automated systems, including a great degree of freedom of movement of the lance, while at the same time simplifying the overall design. Concrete cooling using an automated injection system is desirable because it is safer and allows for increased productivity. The more complex a device is, however, the more expensive it is to fabricate and maintain. In addition, complexity negatively affects fabrication, installation, and removal lead times, which adds to the cost of operation. It is therefore the objective of the present invention to provide a system that is simple in design, inexpensive to make and easy to install, remove and maintain. It is the further objection to provide a system that eliminates damage to the lance device, particularly the rigid lance, in situations where the concrete mixer truck is repositioned before completion of the injection of the cooling fluid.

SUMMARY OF THE INVENTION

The present invention provides a system for injecting a cooling fluid into a concrete mixing container. The system includes a support structure and a lance device that is mounted, preferably movably, on to the support structure. The lance device used in the system comprises an articulated arm and a means that acts on the articulated arm to cause the movement of a rigid lance that is an integral part of the articulated arm. The means that acts on the articulated arm may be either a lone electric actuator or a lone electric motor. The means that acts on the articulated arm provides the ability to exactly position the rigid lance and reduce the chance of a destructive collision of the rigid lance with the concrete mixing container. The means acts on the articulated arm in such as manner as to allow for pivotal non-linear movement of the rigid lance relative to the support structure and concrete mixing container. This pivotal non-linear movement results from the pivotal movements of the various components of the articulated arm with regard to one another (movements that encompass the combined movement across the X and Z axis at the same time). More specifically, the extension or retraction of the actuator or rotational control of the motor allows for control of the angle of the rigid lance while at the same time controlling the insertion and retraction movement of the rigid lance into the concrete mixing container. The present invention further relates to a process for the injection of a cooling fluid into a concrete mixing container utilizing the system of the present invention.

DESCRIPTION OF THE FIGURES

FIG. 5a illustrates an alternative of the front view of the self-seating breakaway mechanism (spring loaded break-away bracket) in case the concrete mixing container moves away while the lance is inserted (the truck drives away before the lance is retracted).

FIG. 8a illustrates an alternative embodiment to that of FIG. 8 as represented with regard to the First Embodiment and the Second Embodiment.

DETAILED DESCRIPTION OF THE INVENTION

Figure 1:
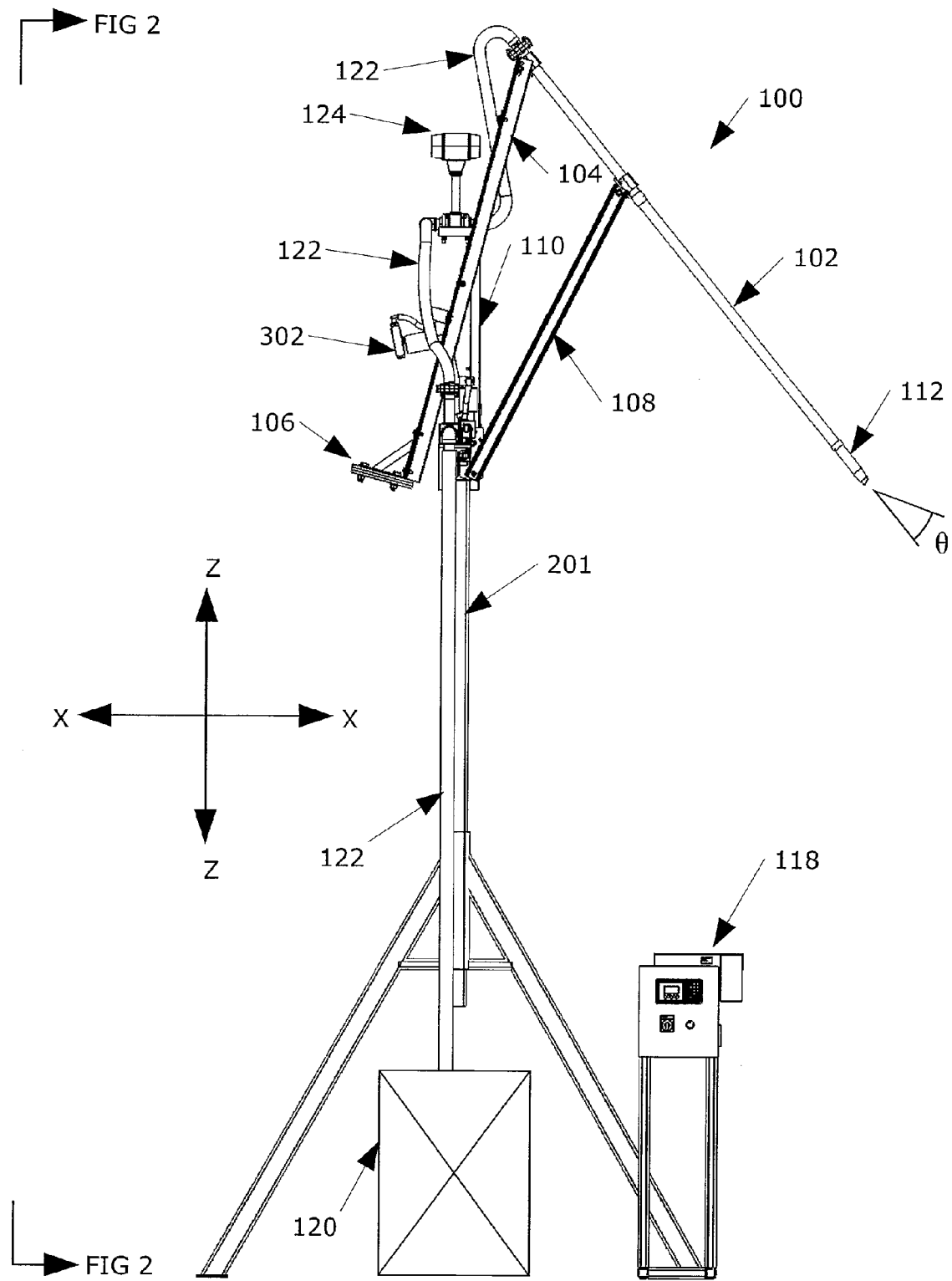
FIG. 1 illustrates a side view of an injection system of one embodiment of the present invention.

The system of the present invention provides an apparatus and a process for injecting a cooling fluid into a concrete mixing container. The system comprises a lance device that is mounted, preferably movably mounted, on to a support structure. The lance device includes an articulated arm and a means that acts on the articulated arm. Through the use of the means that acts on the articulated arm of the lance device, it is possible to control both the angle as well as insertion and retraction movement of the rigid lance with regard to the concrete mixing container. In one embodiment of the present invention, the means comprises a lone electric actuator that acts on the articulated arm. In an alternative embodiment of the present invention, the means comprises an electric motor (rather than an electric actuator). The articulated arm is preferably counter-balanced to minimize the load on the actuator and the required actuator capacity in embodiments that include an actuator and to minimize the load on the motor in embodiments that include a motor. The counter-balance also functions to increase the stability of the lance device of the system since this shifts the center of gravity of the lance device to be in line with the center of gravity of the support structure. Since the rigid lance of the present invention is an integral part of the articulated arm, it does not require a means to travel on rollers as in WO 2006/100550 and therefore does not have to be insulated to prevent ice build-up. This is an advantage since ice can interfere with the insertion and retraction process, and can cause the lance to detach from its support.

In the system of the present invention, the support structure comprises a leg assembly and a cross member beam. The leg assembly has two or more legs which support the cross member beam of the support structure. The cross member beam and the two or more legs are positioned with respect to one another in such a manner that they define a passageway that is of sufficient height (H) and width (W) to allow the passage of a concrete mixer truck through the passageway. For example, in an embodiment with four legs, two legs would support one end of the cross member beam while the other two legs would provide support for the opposing end of the cross member beam with the space beneath the cross member beam and between each set of two legs defining the passageway through which the concrete mixer truck could pass. This in turn allows for the concrete mixer truck to be pulled beneath the injection system and positioned in order to have the cooling fluid injected into the concrete mixing container of the concrete mixer truck. Note that with regard to the legs of the support structure, these legs are intended to include legs that comprise not only one structural component, but also legs that include structural components for support such as cross beams at the base of the leg or tripod support structures at the base of the legs. In a still further embodiment of the present invention, each of the legs (or each of their structures for support) has a wheel attached thereto which allows for ease in the movement of the entire system—the support structure and lance device—from one location to another location. Such wheels are preferably wheels that have multiple positions with swivel lock casters and molded wheels of a plastic such as polyurethane and the like.

The support structure of the present invention may be made of any suitable material that is sufficient in strength to readily support the weight and movement of the lance device of the present system. For example, the support structure may be made from materials such as carbon steel, aluminum, or any alloy that is sufficient in strength to support the weight of the lance device over time. Support structures of the type that may be used in the present system also include commercially available support structures such as gantry cranes. Gantry cranes are available in a variety of sizes, including with a variety of different beam sizes. Note that the means for mounting the lance device of the present system to the cross member beam of the support structure may be configured to adapt to a variety of different beam sizes thereby allowing for the use of a variety of commercially available gantry cranes.

The support structure may be of a fixed height and width or may include a way to change the span of the passageway thereby allowing the passageway of the support structure to be adjusted to accommodate the size of varying cement mixer trucks. As used herein, the term "span" is meant to include adjustments to the height of the support structure alone, the width of the support structure alone, or both the height and width of the support structure. In embodiments where the height and width can be adjusted, such support structures would allow for the adjustment of the height and width by adjusting the position of the cross member beam with regard to the legs of the support structure. Note that in one embodiment, the cross member beam and legs will typically contain drilled holes for receiving bolts thereby allowing for the cross member beam and legs to be bolted together at differing heights and widths.

Besides a support structure, the system of the present invention further includes a lance device that comprises an articulated arm and a means for manipulating (moving) the articulated arm. The articulated arm includes a variety of elongated structures or components that are pivotally connected to one another and which when in motion have a large and diverse range of motion (one which because of the pivotal attachment of the components with respect to one another changes the position of the rigid lance over the range of motion—allows for the rigid lance to follow a non-linear path for example between the fully retracted position of the actuator and the fully extended position of the actuator). More specifically, the articulated arm of the present invention comprises at least a rigid lance, an upper lifting arm, a lower guide arm, and a vertical support member pivotally connected to one another in a specific manner to allow for this large and varied range of motion. The rigid lance of the present invention may be made of a material which withstands exposure to the cooling fluid. Accordingly, the rigid lance is preferably made of steel, aluminum, or any cryogenically compatible rigid material. The upper lifting arm, lower guide arm and vertical support member of the present invention on the other hand do not come directly in contact with the cooling fluid. Therefore, it is possible to have these components made of the same materials as the rigid lance or because of the weight factor and/or costs, have these components made of a cheaper and/or lighter material such as composite materials, wood, hard inflexible plastic or the like.

The rigid lance of the articulated arm is an elongated component having two ends, a fluid receiving end and a fluid exit end. The rigid lance includes a fluid path that runs the length of the rigid lance. This fluid path is in the form of a tube that extends from the fluid receiving end to the fluid exit end and makes up the main body of the rigid lance and allows for the free flow of a cooling fluid through the fluid path. While the cooling fluid may be discharged from the fluid exit end of the rigid lance into the concrete mixing container without the benefit of a nozzle, in some embodiments, an injection nozzle is coupled to the fluid path at the fluid exit end of the rigid lance. This injection nozzle allows for more control of the injection of the cooling fluid into the concrete mixing container of the concrete mixer truck. The injection nozzles may include an angle to help to better direct the cooling fluid into the concrete mixing container. Such nozzles are readily known in the art and may include any known nozzle that is capable of being utilized with the particular cooling fluid of the present invention.

An additional component of the present system is a source of the cooling fluid. While a variety of cooling fluids may be used in the system of the present invention such as chilled water and cryogenic fluids, the preferred cooling fluids are cryogenic fluids such as nitrogen and argon with nitrogen being the most preferred cryogenic fluid. The source of cooling fluid may be contained in any manner that is known in the art. When the cooling fluid is a cryogenic fluid, the cryogenic fluid may be contained in any vessel or container that is known for holding cryogenic fluids including, but not limited to, composite, steel or aluminum cylinders for packaging such cryogenic fluids. The cooling fluid is withdrawn from the cooling fluid source and injected into the fluid receiving end of the rigid lance. The cooling fluid flows from the cooling fluid source to the fluid receiving end of the rigid lance via a fluid line. The injection of the cooling fluid is controlled through the use of an automated valve which may be located at any point between the source of the cooling fluid and the fluid exit end/injection nozzle attached to the rigid lance in conjunction with a means for withdrawing the cooling fluid such as pressure, one or more pumps or gravity. Such fluid lines may be any type of hose or tube that is capable of handing cooling fluids, especially cryogenic fluids. After the cooling fluid is injected into the fluid receiving end of the rigid lance, it flows along the fluid path of the rigid lance and into the concrete mixing container through the first exit end and optionally attached injection nozzle.

The articulated arm further comprises an upper lifting arm which functions as a lever to position the lance. The upper lifting arm has a first end, a second end and a fulcrum between the first end and the second end. The fulcrum is the position where the upper lifting arm is pivotally connected to the vertical support member. The rigid lance of the articulated arm is pivotally connected to the upper lifting arm between the fulcrum and the second end of the upper lifting arm. A counter weight is connected between the fulcrum and the first end of the upper lifting arm. The fulcrum of the upper lifting arm allows for the pivotal connection of the upper lifting arm to the rigid lance to move in a semi-circular motion (travels along an arc or curve in a two dimensionally plane with regard to the center of the arc or curve; see FIG. 3 for a depiction) with respect to the pivotal connection of the upper lifting arm to the vertical support member (travels along a different arc or curve in a two dimensional plane with regard to the center of the arc or curve; see FIG. 3 for a depiction).

As noted, the fulcrum of the upper lifting arm is further pivotally connected to the upper end of the vertical support member. The vertical support member of the articulated arm also includes a lower end which is connected either directly or indirectly to the lower guide arm of the articulated arm. The manner in which the components of the lance device come together at this point (at or near the lower end of the vertical support member) can be represented by a variety of different embodiments.

The First Embodiment involves the pivotal connection of the vertical support member directly to the first end of the lower guide arm and the use of an actuator as the means to move the articulating arm. In this particular embodiment, a mounting bracket for the lance device is preferably located on the lower part of the back or external surface of the vertical support member. The vertical support member may form a portion of the mounting bracket, in which case a mounting bracket member will be bolted to the lower portion of the vertical support member to allow for an open space between the mounting bracket member and the vertical support member in which the cross member beam will be positioned. As described hereinafter, a variety of additional components such as mounting bracket submembers, bearings and/or clamps can be disposed within the space to secure the cross member beam securely between the vertical support member and the mounting bracket member. Alternatively, the mounting bracket can be an individual bracket that is rigidly attached to the lower end of the vertical support member. Also, in order to allow for protection of the lance device from harm caused by the concrete mixer truck pulling away before the completion of injection of the cooling fluid in this particular embodiment, the actuator of the lance device will include a break away bracket as described hereinafter.

Figure 3:
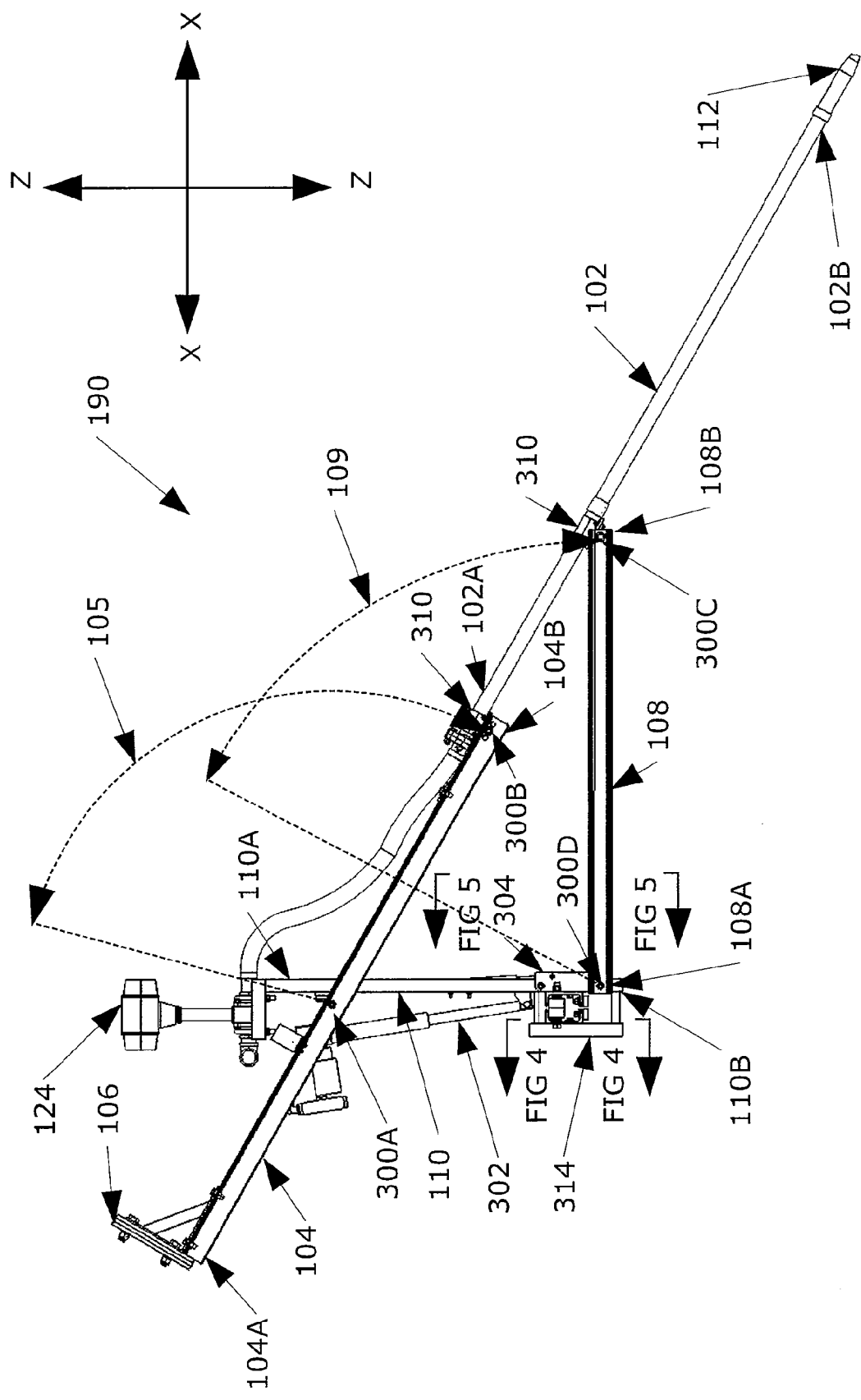
FIG. 3 illustrates one embodiment of the lance device of the present invention in which the actuator is present on the external side of the vertical support member and further includes the range of motion of the upper lifting arm on pivot 300A and the range of motion of the lance guide arm on pivot 300D in order to raise or lower the rigid lance by way of the upper pivot 300B and lower pivot 300 C.
Figure 3A:
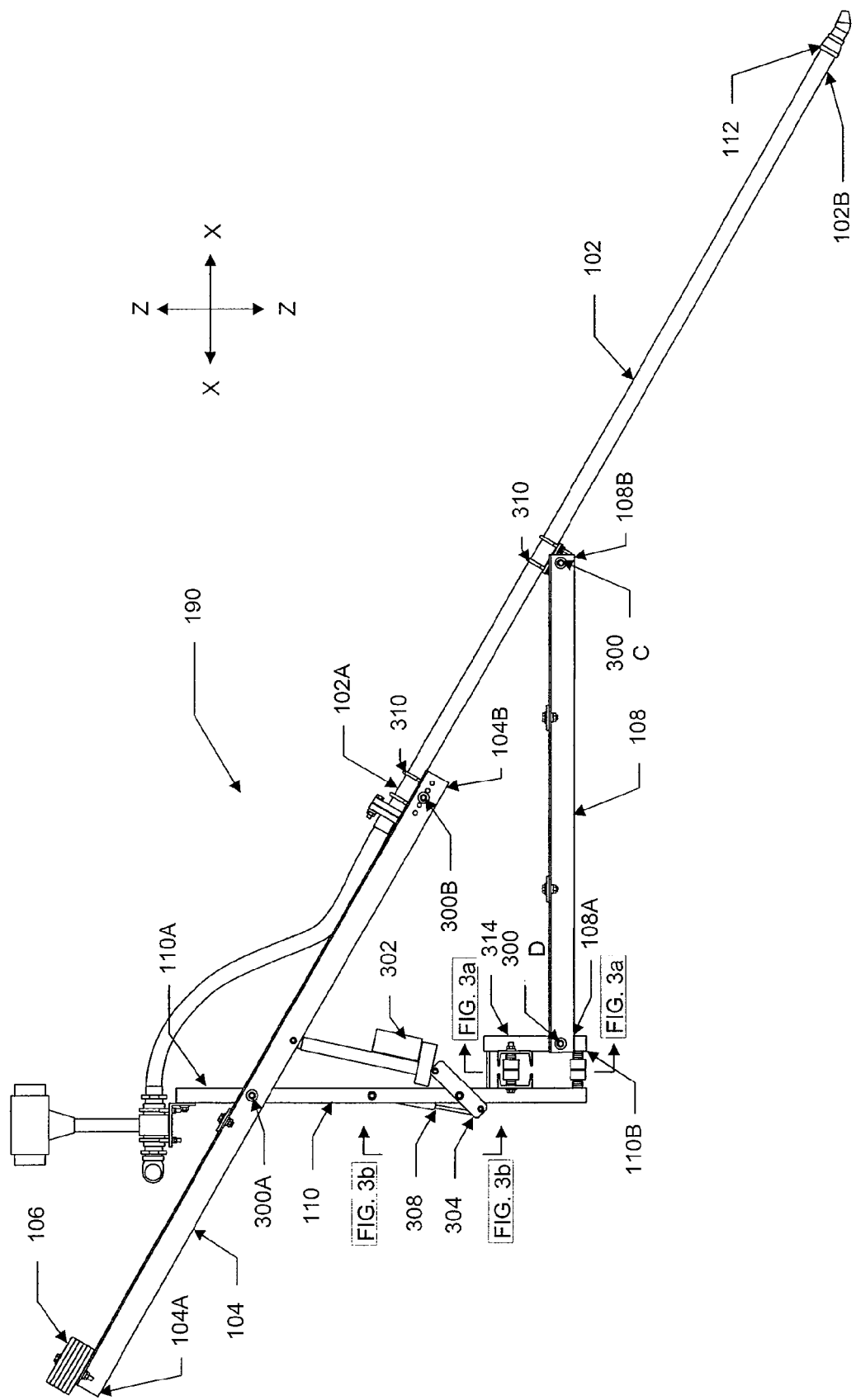
FIG. 3a illustrates an alternative embodiment of the lance device of the present invention in which the actuator is present on the internal side of the vertical support member.

The Second Embodiment is shown in FIG. 3A. This embodiment differs from the First Embodiment in that a mounting bracket is positioned between the lower portion of the vertical support member and the first end of the lower guide arm. The lower portion of the vertical support member may either serve as a portion of the mounting bracket to attach the lance device to the cross member beam of the support structure or may simply have an individual mounting bracket rigidly attached thereto. Furthermore, in this embodiment, the first end of the lower guide arm is pivotally connected to one or more points along the mounting bracket. As with the first embodiment above, in order to allow for protection of the lance device from harm caused by the concrete mixer truck pulling away before the completion of injection of the cooling fluid, the actuator of the lance device will also include a break away bracket.

Figure 6:
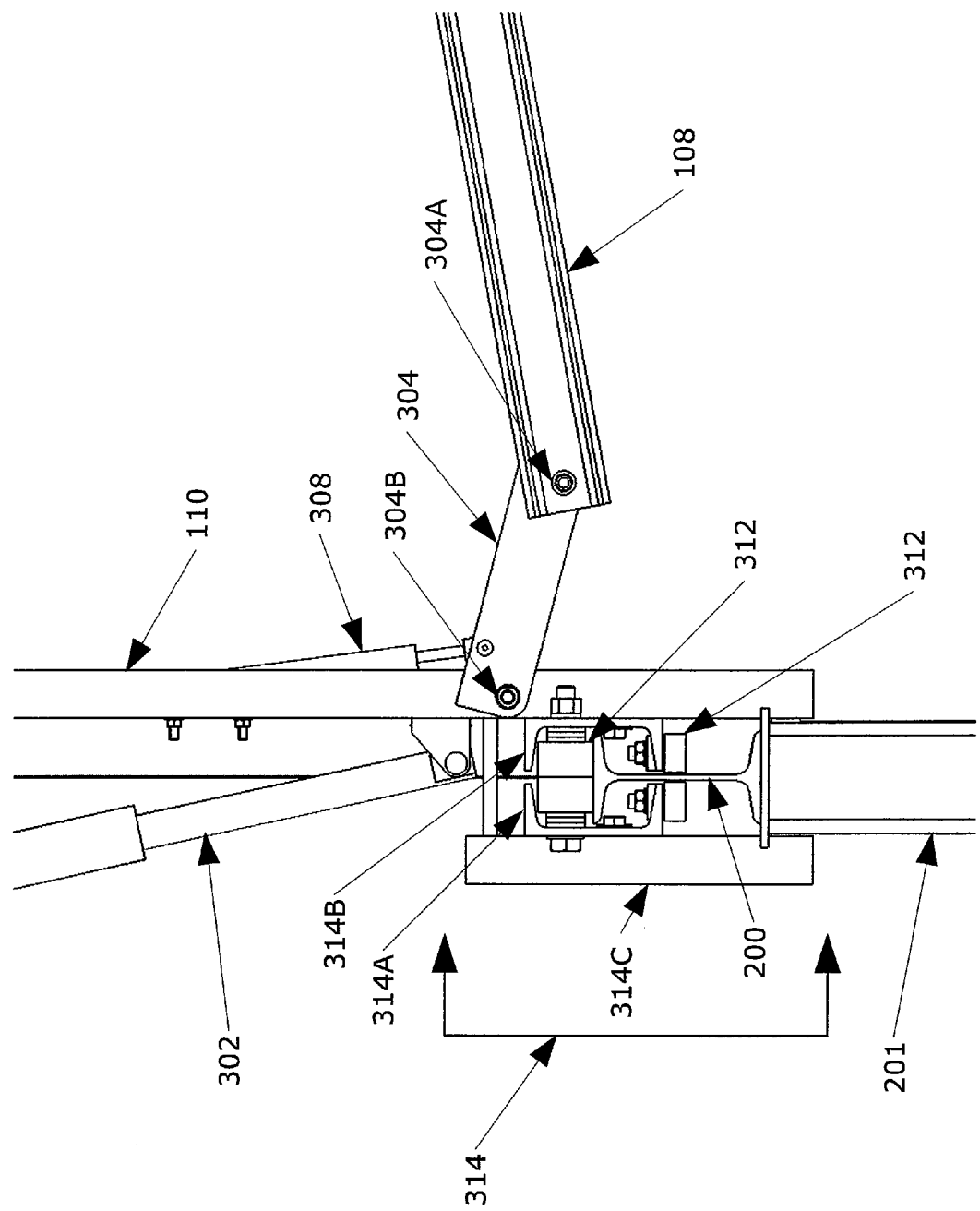
FIG. 6 illustrates a side view of one embodiment of the breakaway bracket that connects the lower guide arm to the vertical support member in which the rotation and subsequent separation of the breakaway bracket in counter-clockwise motion away from the vertical support member occurs when the rigid lance comes in contact with any part of the mixer drum or hopper of the concrete mixing container.

In the Third Embodiment (and most preferred) of the present invention, a break away bracket pivotally connects the vertical support member to the lower guide arm. More specifically, a break-away bracket that is pivotally connected at one or more points along the break-away bracket to one or more points along the lower end of the vertical support member and is further pivotally connected at one or more different points along the break-away bracket to one or more points along the first end of the lower guide arm as shown in FIGS. 3 and 6. In this case, the purpose of the break-away bracket is to allow the lower guide arm to pull away from the vertical support member when the concrete mixer truck pulls away before the rigid lance is retracted in order to prevent damage to the rigid lance or to the concrete mixing container. The break-away bracket is positioned on what is considered to be the internal surface of the vertical support member (the surface face that is closest to the rigid lance). In this particular embodiment, a mounting bracket for the lance device is located on the external side of the vertical support member (the surface that is the furthest away from the rigid lance).

Figure 7:
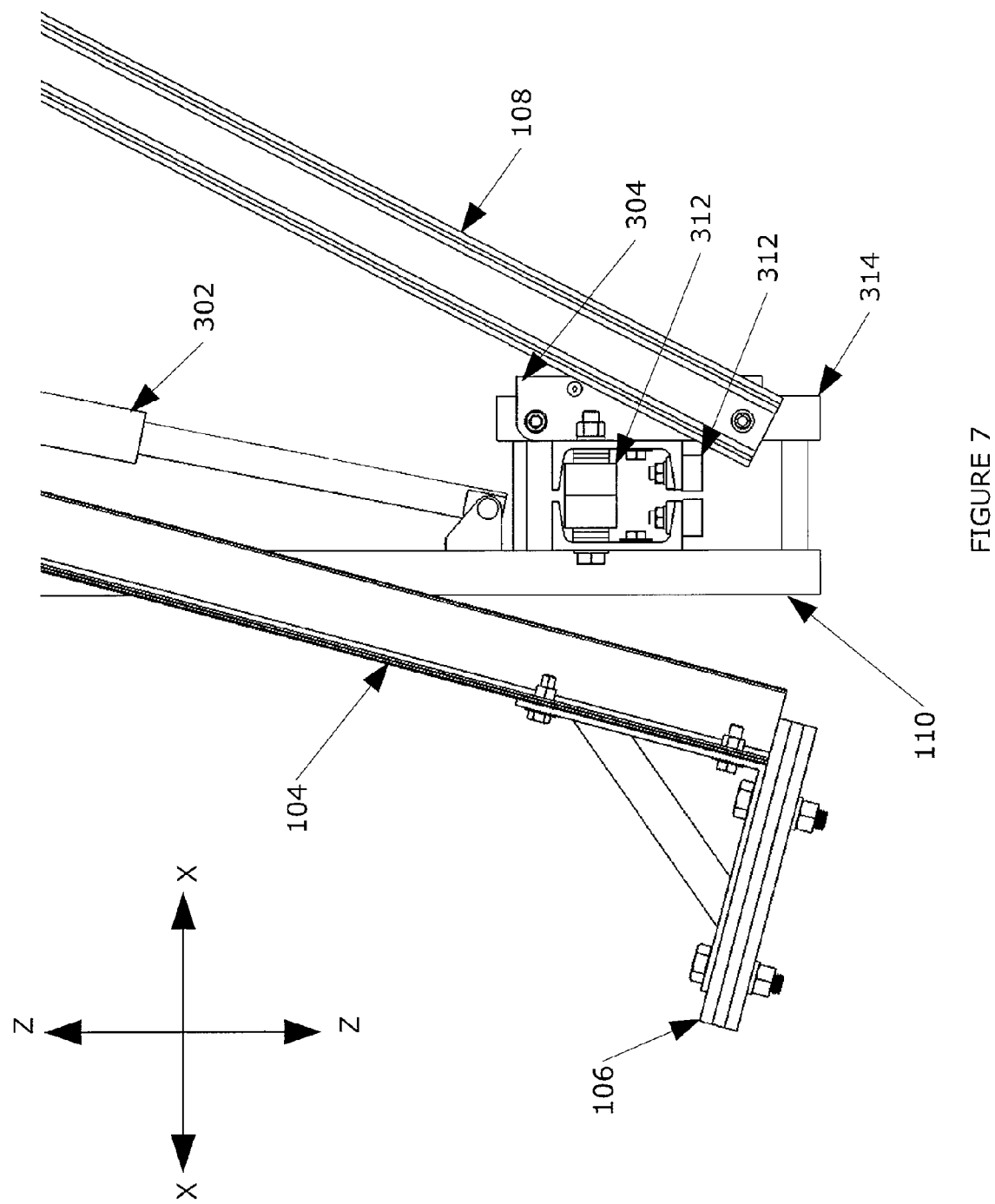
FIG. 7 illustrates a side view of one embodiment of an alternative mounting bracket configuration where the mounting bracket is positioned between the vertical support member and the lower guide arm as represented with regard to the Third and Fourth Embodiments.

The Fourth Embodiment provides not only for a first break-away bracket to be positioned between the vertical support member and the lower guide arm but also for a mounting bracket to be positioned between the vertical support member and the lower guide arm. In this particular embodiment as shown in FIG. 7, the mounting bracket is positioned between the lower end of the vertical support member and one end of the break-away bracket. Accordingly, the vertical support member either forms a part of or is rigidly attached to the mounting bracket at one or more points along the mounting bracket and the break-away bracket is pivotally connected at one or more points along the break-away bracket to the opposing side of the mounting bracket and at another point along the break-away bracket to the lower guide arm. Similar to the Third Embodiment, the purpose of the first break-away bracket is to allow the lower guide arm to pull away from the mounting bracket when the concrete mixer truck pulls away before the rigid lance is retracted to prevent damage to the rigid lance or to the concrete mixing container.

For each of the embodiments noted above, the second end of the lower guide arm is pivotally connected to the rigid lance at a point between the fluid exit end of the rigid lance and the pivotal connection of the rigid lance to the upper lifting arm. The pivotal connection of the lower guide arm to the rigid lance is such that it also allows the pivotal connection to move in a circular motion with regard to the first end of the lower guide arm (see FIG. 3 for depiction of arc).

The lance device of the present invention further comprises a means to manipulate or move the articulated arm of the lance device. This means is selected from an electric actuator or an electric motor. The preferred embodiment utilizes an electric actuator that acts on the articulated arm, the electric actuator being attached by one end of the electric actuator (either directly or through a break-away bracket as noted in embodiments 1 and 2 above) to the vertical support member of the articulated arm and by the opposing end to the upper lifting arm. The positioning of this attachment may vary depending upon the specific embodiment of the invention. More specifically, the electric actuator may be positioned on the front face or internal side of the vertical support member (on the side closest to the rigid lance as depicted in FIG. 3A) or on the back face or external side of the vertical support member (on the side furthest away from the rigid lance as depicted in FIG. 3). In the first instance, one end of the actuator is attached to the front face or internal side of the vertical support member between the lower end of the vertical support member and the point where the vertical support member is pivotally connected at the fulcrum of the upper lifting arm. In this same embodiment, the opposing end of the actuator is attached to the upper lifting arm at a point between the fulcrum and the second end of the upper lifting arm. These connections are such that when the shaft of the actuator is extended or retracted, actuation of the upper lifting arm causes the pivotal movements of the components of the articulated arm in a non-linear motion or fashion which therefore allows for the resulting control of the angle of the rigid lance while at the same time allowing for the insertion and retraction movement of the rigid lance into the concrete mixing container for cooling fluid injection. In this particular embodiment (with the actuator being positioned in the front or internal surface of the vertical support member), the rigid lance is withdrawn from the concrete mixing container when the actuator is fully extended. Also in this embodiment, while the actuator maybe directly attached to the vertical support member, in some embodiments as noted with regard to the First Embodiment and the Second Embodiment above, a break-away bracket will be interdisposed between and thereby provide for an indirect connection of the vertical support member to the end of the actuator.

In an alternative and more preferred embodiment, one end of the actuator is attached to the back or external surface of the vertical support member between the lower end of the vertical support member and the fulcrum. In this same embodiment, the opposing end of the actuator is attached to the upper lifting arm at a point between the first end of the upper lifting arm and the fulcrum. These connections are also such that when the shaft of the actuator is extended or retracted, actuation of the upper lifting arm causes the pivotal movements of the remaining components of the articulated arm in a non-linear motion which allows for the resulting control of the angle of the rigid lance while at the same time allowing for the insertion and retraction movement of the rigid lance into the concrete mixing container for fluid injection. In this particular embodiment (with the actuator being positioned in the back or external surface of the vertical support member), the rigid lance is withdrawn from the concrete mixing container when the actuator is fully retracted. This second embodiment is preferred for two separate reasons: the shaft of the actuator is protected from external exposure when the system is not in use since the shaft is retracted and the weight of the actuator is shifted to the backside of the vertical support system thereby providing additional stability to the system since the center of gravity of the lance device is better centered or in line with the center of gravity of the support structure by bringing the center of gravity of the two components in line with one another this lends additional balance to the entire system. Also in this embodiment, while the actuator may be directly attached to the vertical support member, in some embodiments, a break-away bracket will be interdisposed between and thereby provide for an indirect connection of the vertical support member to the end of the actuator.

Note that in the embodiments that include an actuator with a breakaway bracket, if the mixing truck pulls forward when the rigid lance is extended, counter movement of the lance device will occur. The lance will rotate counter clockwise on the pivot connecting the rigid lance to the lower guide arm (see FIG. 8a). This rotation will exert a downward force on the upper lifting arm and actuator. To prevent damage to the upper lifting arm and actuator, the breakaway bracket will rotate clockwise and allow the upper lifting arm and actuator to move downward in response to the force. The breakaway bracket will also include a spring. This spring will return the bracket to its original position once the lance clears the concrete mixing container. In each of these embodiments, the mounting bracket is located on the external surface of the vertical support member (the surface furthest away from the surface facing the rigid lance).

The electric actuator utilized in the above embodiments is a linear or electromechanical actuator. By utilizing this type of actuator, it is possible to stop at a chosen position within the range of motion rather than having to go the full range of motion as is experienced with other types of actuators. Accordingly, using the electric actuators of the present invention, it is possible to more precisely position the rigid lance with regard to the concrete mixing container. Furthermore, with regard to the First Embodiment and the Second Embodiment discussed above, the electric actuator is preferably a spring loaded electric actuator (one that includes a breakaway bracket with spring attached directly to the actuator at the point where it connects to the vertical support member) to allow for counter movement of the lance device. Counter movement occurs in situations when the concrete mixing truck pulls away from the system before the rigid lance is retracted. This spring loaded mechanism therefore prevents damage to the lance device (particularly the rigid lance) and will automatically return the electric actuator to its original position once the rigid lance has exited the hopper of the truck. Note that the spring may optionally be present in the embodiments where a breakaway bracket is situated between the lower guide arm and the vertical support member (the Third and Fourth Embodiments).

An alternative means to control the movement of the lance is with a single electric motor which indirectly acts on one of the pivots of the lance device. The motor can be attached at any pivot point of the lance device. By manipulating one of the pivot points, this causes movement at that point which consequently changes the angle of all of the components of the lance device due to their pivotal relationship to one another. Preferably, the motor acts on the fulcrum. The preferred motor is a Stepper Motor since it is required to control the rotation of the motor shaft precisely in order to control the movement of the lance device. This control is accomplished with the use of a gear box or a drawn chain or any other means known in the art for such motors.

The actual operation of the system of the present invention for injecting cooling fluid can be accomplished by manual means but the preferred method is by automated means. The system preferably includes an electronic controller that is capable of receiving a variety of signals (origin of signals dependent upon the type of system). The controller can be any controller that is readily known in the art, such as a programmable logic controller (PLC), a programmable automatic controller (PAC), a computer, a distributed control system (DCS), programmable relays and the like. In a more specific embodiment of the present invention, the electronic controller is communicatively coupled to the means for manipulating the articulated arm of the lance device (the electric actuator or the electric motor). In a still further embodiment, the electronic controller is communicatively coupled not only to the actuator or motor of the lance device but also to one or more of the necessary or optional components of the system such as a support structure actuator, a cooling fluid source, one or more sensors on the rigid lance or other parts of the system and one or more cameras. The electronic controller may be in wireless (e.g., infrared, RF, Bluetooth, etc.) or wired communication with the one or more necessary or optional components of the system.

The actual location of the electronic controller is not a critical aspect of the invention. More specifically, in one embodiment the electronic controller may be mounted to the support structure of the system. It is also contemplated that the electronic controller may be remotely located from the system. In one particularly preferred embodiment, the electronic controller is positioned to allow the driver of a concrete truck to reach out of the window of the concrete truck cab and input commands to the electronic controller, while still being close enough to the system to allow the rigid lance to enter the mixer container and inject a cooling fluid therein. In such instances, the electronic controller may also be a handheld device that is in wireless (e.g. infrared, RF, Bluetooth, etc.) communication with the injection system. The handheld device can be operated from any location including the cab of the concrete mixer truck.

The electronic controller may generally be configured to operate each of the respective components in an automated fashion (e.g., according to a preprogrammed sequence stored in memory) or according to explicit user input. The electronic controller may also be equipped with a programmable central processing unit, a memory, a mass storage device, relays and well-known support circuits such as power supplies, clocks, cache, input/output circuits and the like. Optionally, the electronic controller may also include a key-operated locking mechanism which can be used to enable the system. Once enabled, an operator can control the operation of the injection system by inputting commands into the electronic controller. To this end, one embodiment of the electronic controller includes a control panel. The control panel may include a key pad, switches, knobs, a touch pad, etc. In a still further embodiment, the operator is required to input a pass code into the control panel in order to operate the system. The electronic controller may also include, or be connected to, a card reader. The data read from a card by the card reader can be used to determine whether the card holder is an authorized operator. Accordingly, the electronic controller may have a network connection to a database accessed to verify the authorization of the card holder by comparing information read from the card to information stored in the database. In a still further embodiment, the electronic controller has a wireless receiver (e.g., RF receiver) which can detect a signal of a wireless transmitter associated with a particular operator. On the basis of the wireless signal, the controller can determine whether the particular operator is an authorized user. Accordingly, in the present system, any number of authentication control devices and/or access control devices are contemplated. The electronic controller may also be configured to track various information related to the use of the present system. Accordingly, operator identity and other usage information (e.g., time and date, quantity of cooling fluid, temperatures, etc.) can be tracked. The controller may also include an output device (e.g., a display and/or a speaker) that provides information to the operator including, e.g., information regarding the progress of the current injection cycle.

In the operation of the electronic controller of one particular embodiment of the present system, the electronic controller issues commands to the one or more components of the system and, in some cases, receives feedback from the components. For example, with regard to the injection of cooling fluid, the electronic controller issues control signals to the sole actuator of the lance device to orient the rigid lance at a desired position/angle while at the same time positioning the rigid lance in the concrete mixing container. Once the rigid lance is properly positioned, the electronic controller issues a command to open the appropriate valve of the cooling fluid source, whereby cooling fluid is allowed to flow from the cooling fluid source and ultimately out of the injection nozzle and into the concrete mixing container. Once the injection of the cooling fluid is complete, the electronic controller issues a further command to close the appropriate valve of the cooling fluid source. Once the valve is closed, the remaining cooling fluid that is downstream from the valve is allowed to drain out of the injection nozzle into the concrete mixing container and the rigid lance is then retracted. At this point, the injection is complete.

The electronic controller may also function to assist in the actual insertion of the rigid lance into the concrete mixing container. More specifically, in one embodiment of the present invention, the electronic controller is further communicatively coupled to sensing equipment that is configured to facilitate inserting the rigid lance into the concrete mixing container. Such equipment includes, but is not limited to, one or more sensors and one or more cameras. The sensors may be any type of sensing device or system configured that will allow for the detection of the rigid lance with regard to the proximity of the surface (outer and inner) of the concrete mixing container. Illustrative sensors include acoustic sensors and optical (e.g., laser) sensors. During operation of the system, the sensors detect a relative distance/location of the container and provide the detected distance/location information to the electronic controller. For example, the electronic controller then responds by issuing signals to the actuator of the lance device thereby allowing the adjustment in the orientation of the rigid lance (the electronic controller indirectly makes the appropriate adjustments to the orientation of the rigid lance) during continued extension (insertion) of the rigid lance into the concrete mixing container. In this way, the electronic controller and the one or more sensors define a closed loop feedback system configured to ensure that the rigid lance avoids contacting the concrete mixing container and terminates at a desired location within the concrete mixing container. Alternatively, or in addition to the one or more sensors, one or more cameras may be provided to capture and transmit pictures (via, e.g., video feed) to an output device. The operator of the system may then observe the operation of the rigid lance via the output device and in certain instances override the electronic controller to make the necessary adjustments.

In a still further embodiment of the current system, the electronic controller is further communicatively coupled to temperature sensing equipment that may also be represented by one or more sensors. The temperature sensors could be any type of temperature sensors contemplated in the art, such as a contact type or contactless device. In general, a contact type element could be inside or outside of the concrete mixing container. The contact type temperature probe could be a temperature measuring element in contact with the outer surface of the drum of the concrete mixing truck to take skin temperature readings. Illustrative contact elements include thermocouples and thermistors. Regardless of the type of contact element, it may be constructed such that contact is maintained during rotation of the drum, i.e. by being spring loaded or using a brush type probe having sufficient flexibility to adapt to the outer surface of the drum as it rotates. It is also contemplated that the contact element may be in direct contact with the concrete mixture. An example of a contactless temperature measuring device is an infrared sensor. Infrared measuring devices are well-known and are capable of measuring an object's (e.g., concrete mixture) temperature from a distance. The infrared sensor may be mounted on the system (e.g., on the rigid lance) in a manner that the infrared light can be projected into the mixture in order to take a temperature reading of the concrete mixture. In one embodiment, the infrared measuring device may include a laser sight to facilitate aiming the infrared light a desired spot. In operation, the temperature sensor measures the temperature of the mixture (e.g., concrete mixture) contained in the container during a mixing operation. If the mixer or the concrete mix were to become too cold, the controller shuts down the system. In one embodiment, the operator first inputs a desired temperature (temperature setpoint) of the mixture to be cooled, before the cooling fluid injection begins. Once the temperature setpoint is reached, the controller may issue a command to stop the flow of the cooling fluid, and immediately or shortly thereafter retract the rigid lance from the container. It is also contemplated that the temperature of the cooling fluid flowing through the rigid lance is measured.

In a preferred embodiment of the present invention, the electronic controller receives a signal for an inclinometer mounted to the upper lifting arm, the lower guide arm or pivoting bracket of the lance device. The inclinometer provides a reading of the angle of the upper lifting arm or lower guide arm to the electronic controller which in turn acts on this information in making a determination of when to stop the actuator or motor (when the desired angle of insertion is reached). The inclinometer may also be used in some cases to prevent the actuator or motor from retracting or inserting beyond a particular point.

In a still further embodiment, a potentiometer is used to judge the length of actuation of the actuator. As the potentiometer measures the desired reading (the resistance), the electronic controller which receives this reading makes the determination of when to cut off the motion thereby limiting the range.

While the above sensors (potentiometers and inclinometers) can be used to trigger the electronic controller, those of ordinary skill in the art will recognize that other means such as external limit switches may also be used to accomplish the same result.

By using an electronic controller in the system of the present invention, if the rigid lance encounters an obstacle during the insertion of the rigid lance into the concrete mixing container, the actuator (through the spring loaded break-away bracket utilized in various embodiments) will rotate free. The electronic controller registers a current spike in the actuator (due to the actuator needing more power to overcome the obstacle) and triggers the rigid lance to retract. This prevents damage to the system and will allow for the automatic resetting as the lance separates from the obstacle. Limit switches can be used to accomplish the same result.

As noted above, the lance device may be permanently mounted or moveably mounted to the cross member beam of the support structure. Those of ordinary skill in the art will recognize that the lance device may be permanently mounted to the cross beam member using a variety of means known in the art such as bolts, brackets or trolleys. Furthermore, those of ordinary skill in the art may further recognize that the lance device may be moveably mounted to the cross beam member utilizing a variety of means including individual brackets with rollers and/or linkages or low friction guides to attach the lance device to the cross member beam. The means for permanently or moveably attaching the lance device to the cross member beam can be through the joining of the vertical support member with a mounting bracket to secure the lance device to the cross member beam. This mounting bracket may be permanently or moveably mounted to the cross member beam by any means known in the art or may allow for the loosening of the brackets to manually or through the assistance of power to slide the lance device along the cross member beam from one position to another position. The lance device can also be slidably mounted to the cross member beam on one or more roller bearings or low friction guides that are positioned within the mounting bracket. In one embodiment, four roller bearings are utilized. Each roller bearing can be disposed in, and travel on the beam, or a track attached to the beam. In a still further embodiment, the vertical support beam comprises a portion of the mounting bracket wherein a mounting bracket member is joined with the vertical support member to define a passage in which at least a portion of the cross member beam is disposed. As in the above embodiment, this embodiment may also include rollers and/or linkages or low friction guides. While any type of bracket known in the art may be utilized to accomplish this attachment, brackets such as the type depicted in FIG. 6 are preferred. In this mounting bracket, as noted, the vertical support member serves to provide the backing to which a mounting bracket member is attached by two or more elongated bolts. As further shown in FIG. 6, within the passage defined by the bolting of the vertical support member to the mounting bracket member, there is further mounted a system of rollers which guide the lance device along the cross member beam of the support structure. In addition, there may also be seated within the mounting bracket a sub- or second mounting bracket comprising two mounting bracket submembers with one submember rigidly attached to the mounting bracket member and the other rigidly attached to the vertical support member to form a passage in which at least a portion of the cross member beam is positioned. Often these types of sub- or second brackets are used for further stabilization. Bidirectional lateral movement of the lance device across the cross member beam is thus possible. The lance device may be moved across the cross member beam manually by the operator or through a support structure actuator that is attached to the cross member beam. In the alternative, it is contemplated that a drive device, such as a motor connected to the roller bearing, a mechanical arm, or an operator could control the bidirectional movement of the lance device. Thus, as the lance device moves along the support structure, the rigid lance moves along the cross member beam so that the rigid lance can be better aligned with the opening of the concrete mixing container. A commercially available trolley may also be used to achieve the above.

The present invention also comprises a process for cooling a concrete mixture. The first step of the process comprises providing a system for injecting a cooling fluid into the concrete mixture. The system to be used in the process of the present invention is the system as described hereinbefore. More specifically, the system comprises a support structure having connected thereto a lance device comprising an articulated arm and a means for acting on the articulated arm. The articulated arm includes a rigid lance that comprises a fluid receiving end, a fluid exit end, a fluid path in the form of a tube that extends from the fluid receiving end to the fluid exit end and allows for the flow of a cooling fluid therethrough and an optional injection nozzle fluidly coupled to the fluid path at the fluid exit end of the rigid lance. The lance device is moveably disposed on the support structure and capable of moving the rigid lance in a nonlinear manner. The system further comprises a cooling fluid source fluidly coupled to the fluid path of the rigid lance.

In the process of the present invention, the second step involves positioning the fluid exit end/injection nozzle of the rigid lance relative to an opening in a concrete mixing container. This position is adjusted through the actuator or motor acting on the articulated arm thereby allowing the extension of the rigid lance and subsequent insertion of at least the fluid exit end/injection nozzle of the rigid lance into the concrete mixing container. In those situations where the concrete mixer trucks will be the same types of concrete mixer trucks (same in height, width and angle of the concrete mixing container), it is possible to save the parameters of injection to allow for repeated placement of the rigid lance for similar trucks without the need to recalculate or adjust the placement. Once fluid exit end/injection nozzle of the rigid lance is inserted into the concrete mixing container, a cooling fluid is then injected into the concrete mixing container by flowing the cooling fluid from the fluid source into the receiving end of the rigid lance, along the fluid path of the rigid lance and out the fluid exit end through the injection nozzle (when present) and into the concrete mixing container. The starting and stopping of the injection of this cooling fluid can be controlled through the use of a valve positioned along the fluid line between the cooling fluid source and the fluid exit end/injection nozzle of the rigid lance.

When necessary, the position of the fluid exit end/injection nozzle of the rigid lance may be adjusted by issuing respective command signals from an electronic controller as described hereinbefore. The adjustment may be accomplished by first detecting a relative position of the rigid lance and the opening using sensing equipment as described hereinbefore and then responsively moving the rigid lance into a desired position relative to the opening. More specifically, a command signal is issued from the electronic controller to the actuator or motor of the lance device that is coupled to the support structure. The resulting movement by the actuator or motor thereby allows for the rigid lance to achieve a desired angular orientation of the rigid lance relative to the opening of the concrete mixing container. Alternatively, the rigid lance is adjusted by issuing command signals from an electronic controller that is operated from a cab of the cement truck. In a still further embodiment of the process of the present invention, the conditions of the concrete mix are monitored. This monitoring may comprise monitoring the temperature of the concrete mixture. This may be accomplished by mounting one or more temperature sensors on the rigid lance.

Once the injection is complete, the valve is closed thereby cutting off the flow of cooling fluid. Once the remaining cooling fluid has drained from the rigid lance, the rigid lance is withdrawn form the concrete mixing container and the process is complete.

Figure 2:
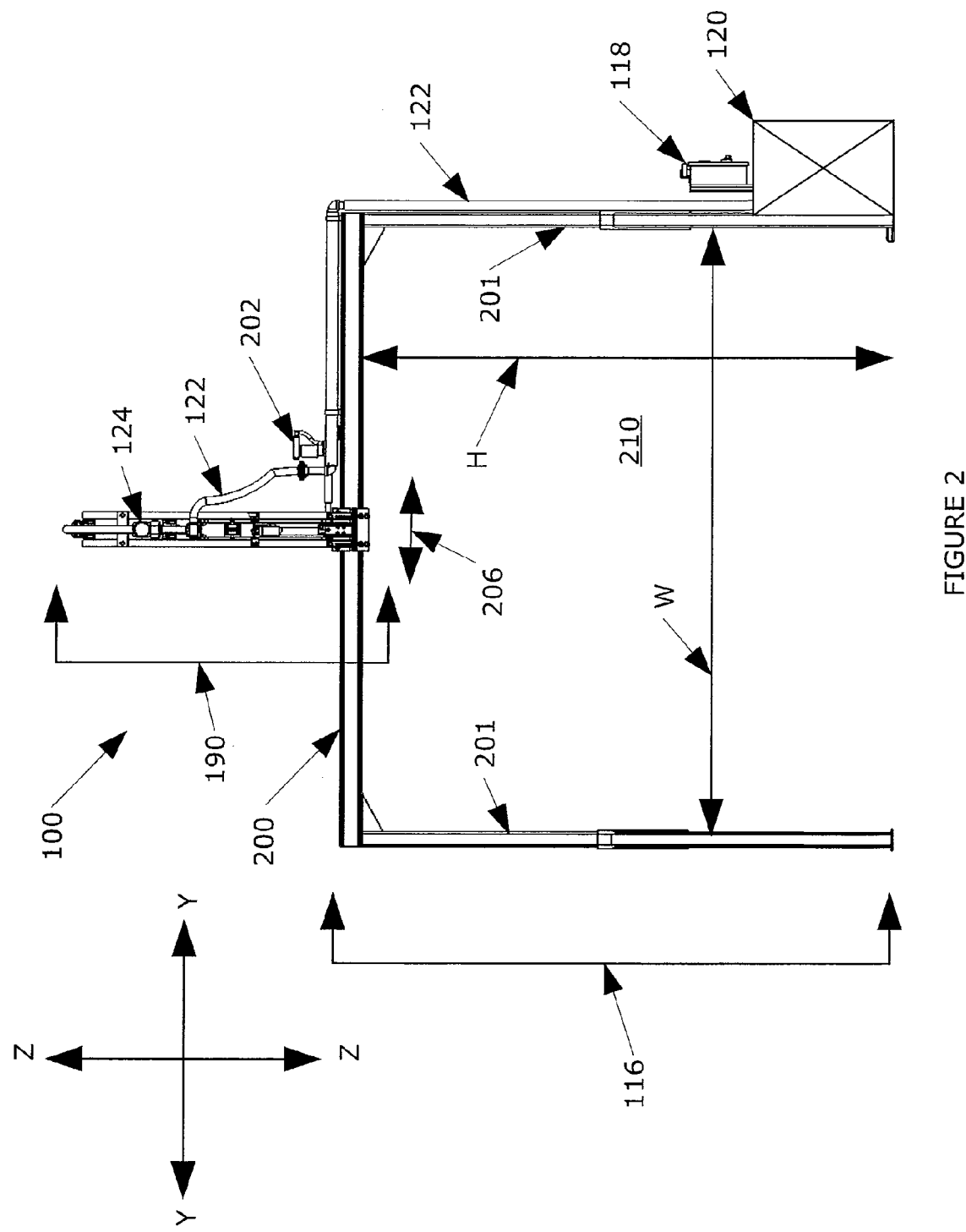
FIG. 2 illustrates a front view of an injection system according to the embodiment of the invention depicted in FIG. 1.

For a further understanding of the nature and objects of the present invention, reference is made to the detailed description, taken in conjunction with the accompanying figures, in which like elements are given the same or analogous reference numbers. FIGS. 1 and 2 of the present invention illustrate a side view and a front view, respectively, of a system (100) for injecting a cooling fluid into a concrete mixing container (502) comprising a lance device (190) mounted, permanently or moveably, on a support structure (116). The embodiment depicted in these figures is a preferred embodiment of the present invention. In this system (100), the lance device (190) has a rigid lance (102) configured to inject a cooling fluid which flows along a fluid line (122) from a cooling fluid source (120) into a container (e.g. concrete mixing container (502) such as the one shown in FIG. 9). The rigid lance (102) is pivotally attached to an upper lifting arm (104) and a lower guide arm (108). These attachments, along with the attachment to the vertical support member (110) allow for the rigid lance (102) to be moved into and out of the concrete mixing container (502) in a non-linear fashion. The non-linear fashion of movement achieved not only allows for movement of the rigid lance (102) into and out of the concrete mixing container (502) but also the positioning of an injection nozzle (112) (or fluid exit end of the rigid lance when there is not an injection nozzle) located on one end (the fluid exit end) of the rigid lance (102) with respect to the surface of the concrete mixing container (502).

The rigid lance (102) is capable of non-linear movement as defined by the lengths of the components or elongated members of the articulated arm. In FIG. 3, the lance device (190) comprises an articulated arm (102, 104, 108, and 110) and an actuator (302) with the actuator (302) used being located on the external side or surface of the vertical support member (110) of the articulated arm. FIG. 3a provides an alternative embodiment in which the actuator (302) used is located on the internal side or surface of the vertical support member (110) of the articulated arm. The components of the articulated arm include a rigid lance (102) having a fluid injection end (102A) and a fluid exit end (102B), an upper lifting arm (104) having a first end (104A) and a second end (104B), a lower guide arm (108) having a first end (108A) and a second end (108B), and a vertical support member (110) having an upper end (110A) and a lower end (110B). With regard to these components, as shown in FIGS. 3 and 3a, the fluid receiving end (102A) of the rigid lance (102) is pivotally connected to the second end (104B) of the upper lifting arm (104). The upper lifting arm (104) is further pivotally connected to the upper end (110A) of the vertical support member (110) at a point between said first end (104A) of said upper lifting arm (104) and the second end (104B) of the upper lifting arm (104). The second end (108B) of said lower guide arm (108) is pivotally connected to the rigid lance (102) at a point between the fluid exit end (102B) of the rigid lance (102) and the pivotal connection of the rigid lance (102) to the upper lifting arm (104). In FIG. 3, the first end (108A) of the lower guide arm (108) is indirectly connected to the lower end (110B) of the vertical support member (100). The indirect connection is the result of the placement of a breakaway bracket (304) between the vertical support member (110) and the lower guide arm (108). In FIG. 3a, a mounting bracket (314) is positioned between the vertical support member (110) and the lower guide arm (108). The first end (108A) of the lower guide arm (108) is therefore pivotally connected to the mounted bracket (314).

In each of the above embodiments, the upper lifting arm (104) rotates pivotally on the pivot (300A) to raise or lower the rigid lance (102) by way of the upper pivot (300B). To adjust the rigid lance's (102) path of travel, there are a number of positions (not shown) along the upper lifting arm (104) for the pivot (300B) (not shown). The lower guide arm (108) guides the rigid lance (102) throughout the movement by way of the lower pivots (300C and 300D). It is also envisioned that the lower guide arm (108) have multiple positions (not shown) to attach to the rigid lance (102) to further adjust the path of travel if required. As further shown in FIGS. 3 and 3a, the fulcrum (300A) of the upper lifting arm (104) allows for the pivotal connection (300B) of the upper lifting arm (104) to the rigid lance (102) to move in a semi-circular motion (as depicted in the arc or curve 105) with respect to the pivotal connection (300A) of the upper lifting arm to the vertical support member (travels along a differential arc or curve in a two dimension plane with regard to the center of the arc). At the same time, the second end (108B) of the lower guide arm (108) is pivotally connected (300C) to the rigid lance (102) at a point between the fluid exit end (102B) of the rigid lance (102) and the pivotal connection (300B) of the rigid lance (102) to the upper lifting arm (104). The pivotal connection (300C) of the lower guide arm (108) to the rigid lance (102) is such that it also allows the pivotal connection (300C) to also move in a circular motion with regard to the first end (108A) of the lower guide arm (108) to form an arc or curve (as depicted in the arc or curve 109).

In FIGS. 3 and 3a, the connection of the rigid lance (102) to the upper lifting arm (104) and lower guide arm (108) is secured though the use of pivoting brackets (310). The lance (102) is rigid and acts as a member of the articulated arm in addition to conveying the cooling fluid. Since the pivoting brackets (310) are connected at two separate points along the rigid lance (102) and follow two separate curved paths, the rigid lance (102) path is non-linear. The pivoting brackets (310) can be positioned anywhere along the rigid lance (102) utilizing any known means for attaching or clamping the two components together including, but not limited to, the use of u-bolts or clamps.

As further depicted in FIGS. 3 and 3a, actuation of the upper lifting arm (104) by the actuator (302) is assisted by the addition of a counterweight (106) which is attached at or near the first end (104A) of the upper lifting arm (104). For optimum stability of the system (100), the counterweight (106) also maintains the center of gravity of the lance device (190) close to the cross beam member's (200) Z-axis center line. As further detailed in FIG. 3, the actual weight of the counterweight (106) can be distributed to achieve optimum stability. Actuation can also be assisted by the addition of counterweight springs or counterweight gas springs (not shown) acting on the upper lifting arm (104)

Figure 5:
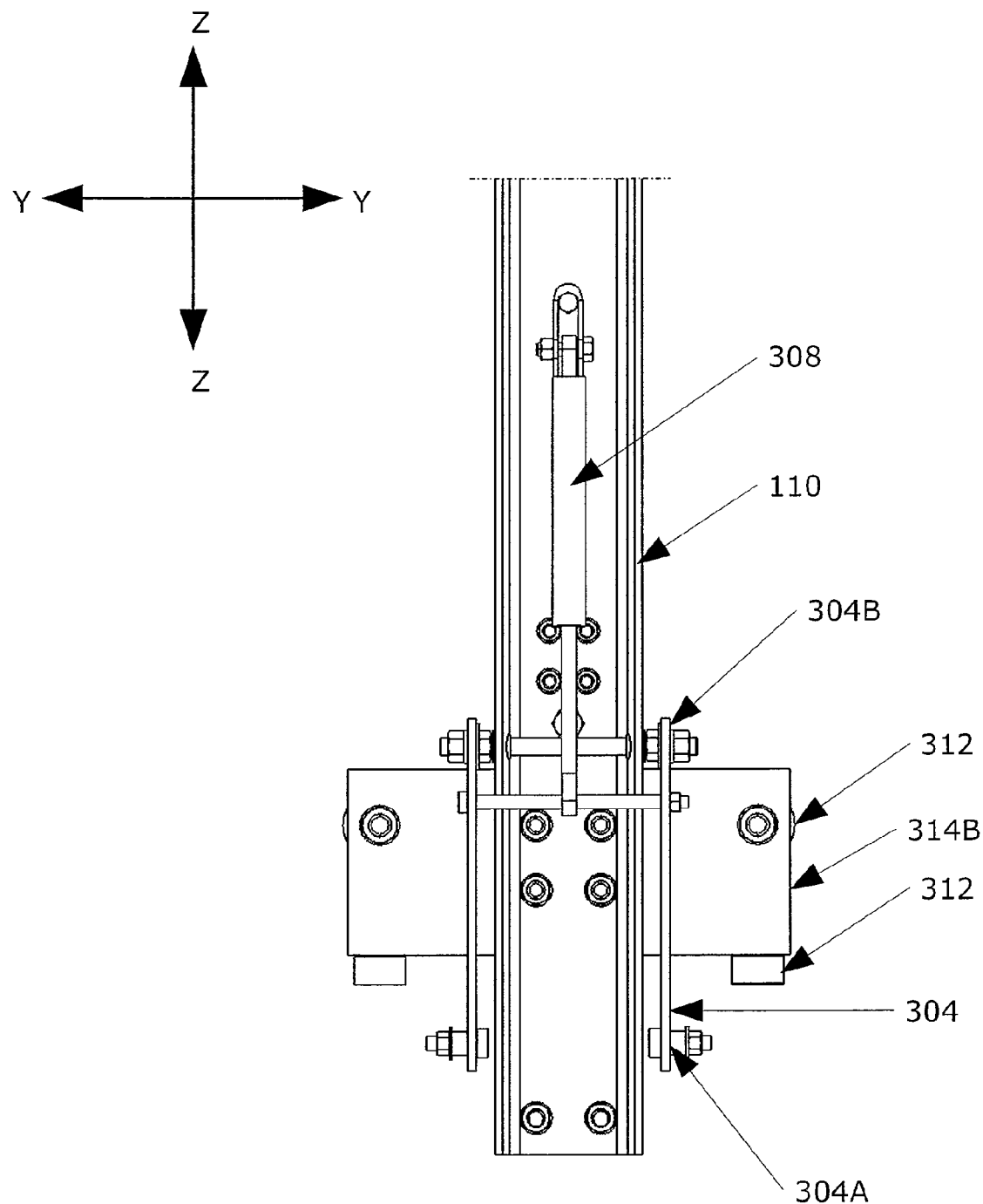
FIG. 5 illustrates the front view of the self-seating break-away mechanism (spring loaded break-away bracket) in case the concrete mixing container moves away while the lance is inserted (the truck drives away before the lance is retracted).
Figure 8:
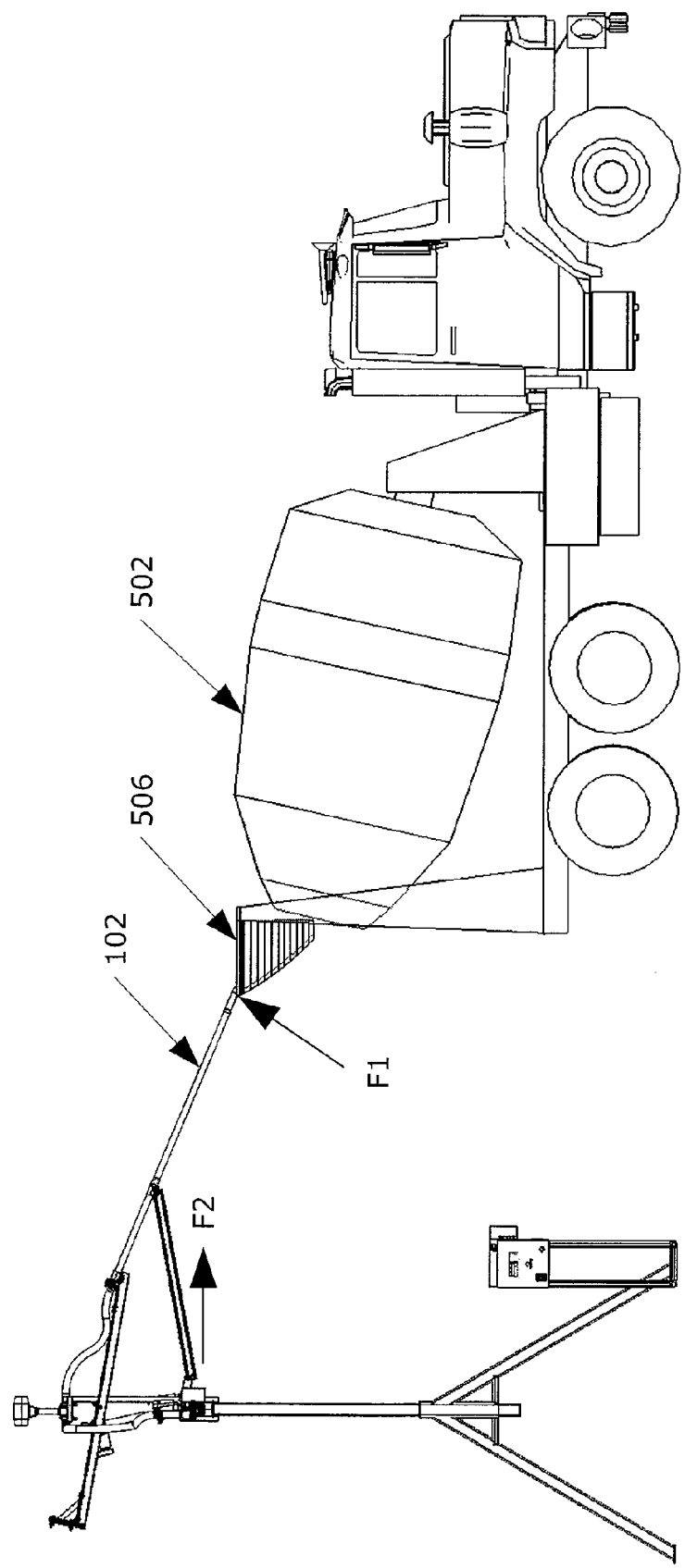
FIG. 8 illustrates how the exertion of force "F1" on the rigid lance in instances where the rigid lance cannot be retracted from the concrete mixing container occurs without damaging the rigid lance (though the use of a breakaway bracket) as represented with regard to the Third Embodiment and the Fourth Embodiment.

The two embodiments shown in FIGS. 3 and 3a each include a breakaway bracket (304). In the embodiment represented by FIG. 3, the breakaway bracket (304) pivotally connects the lower guide arm (108) of the articulated arm to the vertical support member (110). In this embodiment, through the use of the break-away bracket (304), it is possible to allow for the lower guide arm (108) to be pulled away from the vertical support member (110) when the concrete mixer truck (504) pulls away before the rigid lance (102) is retracted. This actual situation showing the position of the break-away bracket when it is pulled away from the vertical support member is shown in FIG. 8. FIG. 5 further provides a front view of the breakaway bracket (304) of FIG. 3. In FIG. 5, from the front view the mounting bracket (314B) is visible behind the vertical support member (110). The breakaway bracket (304) can be seen in front of the vertical support member (110). The breakaway bracket (304) is attached to the lower guide arm (108) at the position noted by (304a) and to the vertical support member (110) at the position noted by (304B). This embodiment also includes a gas spring (308) to reseat the breakaway bracket. FIG. 6 further provides a side view of the breakaway bracket (304) as it is attached to the vertical support member (110) and the lower guide arm (108) during a breakaway event. Note the gas spring (308) is attached to the vertical support member (110) and the breakaway bracket (304) to reseat the breakaway bracket. FIG. 6 further provides the orientation of the breakaway bracket (304) with regard to the vertical support member (110) and lower guide arm (108) when force is being exerted on the lower guide arm (108) to the point that it causes the breakaway bracket (304) to disengage from the vertical support member (110).

In the particular embodiment demonstrated by FIG. 3, the mounting bracket (314) is located on the external surface of the vertical support member (110). A further modification to this involves placing the mounting bracket (314) between the breakaway bracket (304) and the vertical support member (110) as represented by the Fourth Embodiment discussed hereinbefore and shown in FIG. 7. In this particular embodiment, the mounting bracket (314) is rigidly attached on one side to the vertical support member (110) and pivotally attached on the opposing side to the breakaway bracket (304). The breakaway bracket (304) is further pivotally attached at a different point to the lower guide arm (108).

Figure 4:
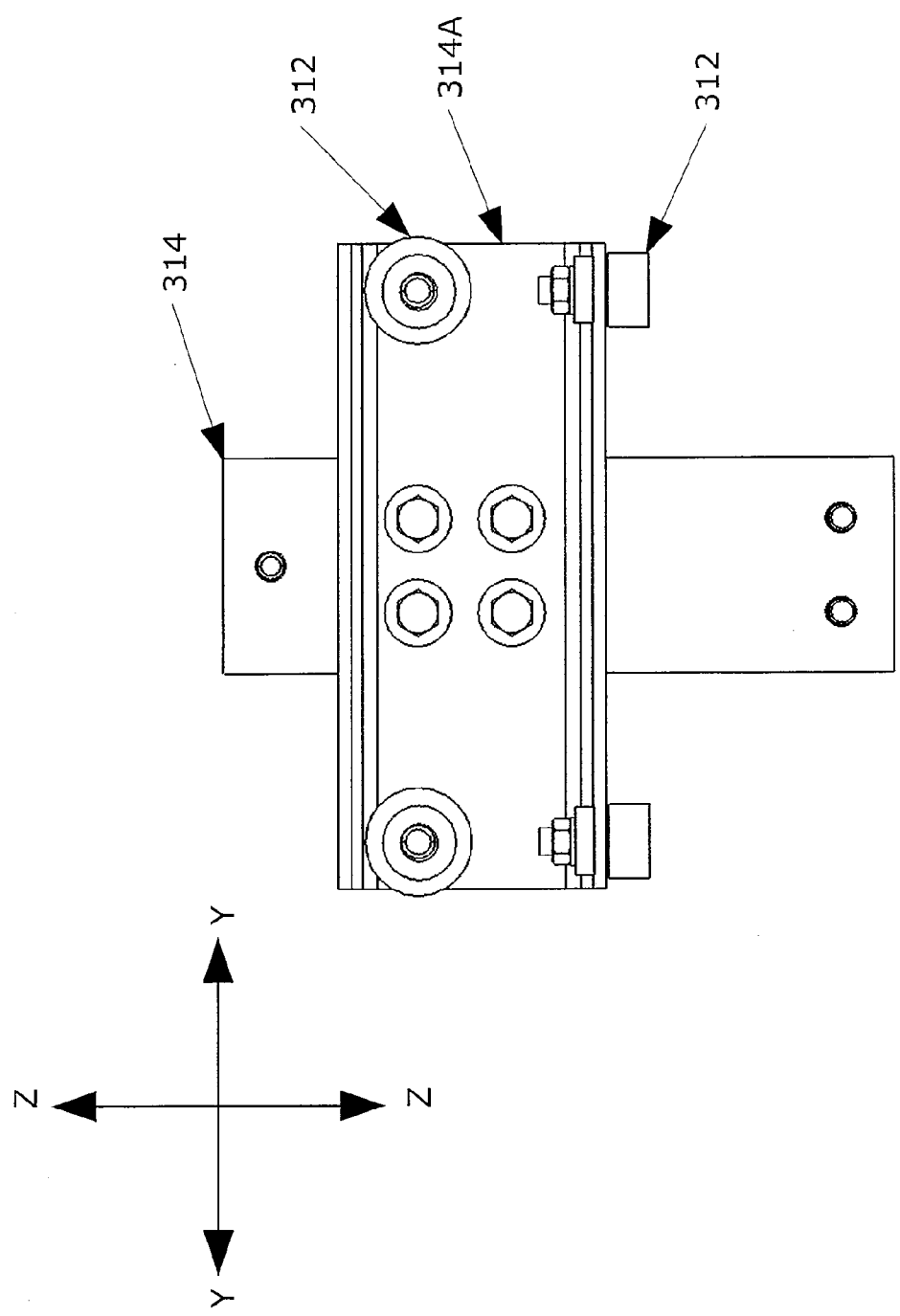
FIG. 4 illustrates one embodiment of the mounting bracket that may be used to attach the lance device to the cross beam member of a support structure.

In FIG. 3a, the mounting bracket (314) is positioned between the lower end (110B) of the vertical support member (110) and the first end (108A) of the lower guide arm (108). The mounting bracket is rigidly attached to the vertical support member (110) and pivotally connected along the opposing side of the mounting bracket (314) to the lower guide arm (108). FIG. 4 provides a more detailed structure of the mounting bracket (314) which further includes roller bearings (312) which can be used to assist in maintaining the stability of the lance device (190). In FIG. 4, the mounting bracket submember (314A) is also included to further provide stability. The breakaway bracket (304) is not attached to the lower guide arm (108) in this embodiment, but instead serves to attach the actuator (302) to the vertical support member (110). In this particular embodiment, a second breakaway bracket (306) is seated inside of the first breakaway bracket (304). In this embodiment, the actuator (302) is forced toward the vertical support member (110) in a situation where the truck (504) drives away before the rigid lance (102) is retracted. More specifically, the break-away bracket (304) rotates clockwise, pushes on the second breakaway bracket (306) which compresses the gas spring (308). This actual situation showing the position of the break-away bracket when it is pulled away from the vertical support member is shown in FIG. 8a. In the situation where the rigid lance (102) is being inserted and comes in contact with part of the concrete mixing container (502) due to misalignment of the rigid lance (102) and concrete mixer truck (504), the actuator (302) will pull and rotate the breakaway bracket (304) away from the second breakaway bracket (306) on their shared pivot (304B). The separation of both breakaway brackets (304 and 306) will trigger a switch of the electronic controller (118) to signal the rigid lance (102) to retract.

Figure 6A:
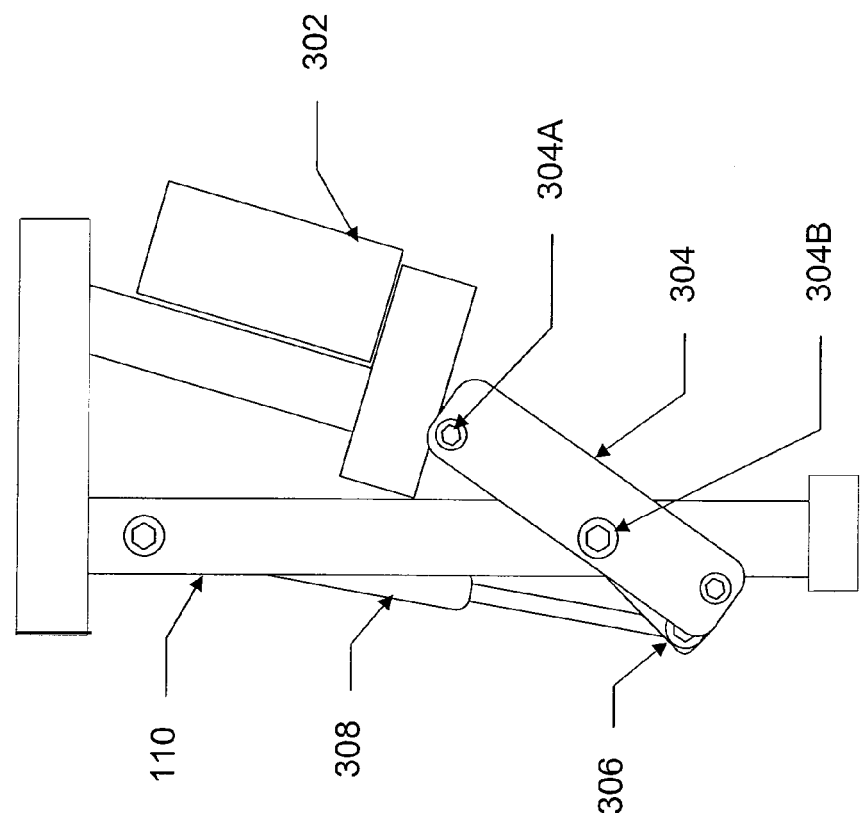
FIG. 6a illustrates a side view of an alternative embodiment of the breakaway bracket that connects the actuator and the vertical support member in which the rotation and subsequent separation of the breakaway bracket in counter-clockwise motion away from the second breakaway bracket occurs when the rigid lance comes in contact with any part of the mixer drum or hopper of the concrete mixing container.

FIG. 5a provides a front view of the breakaway bracket of FIG. 3a. In FIG. 5a, the relation of the breakaway brackets (304 and 306) is readily visible with regard to the vertical support member (110) and the gas spring (308). FIG. 6a provides a side view of the breakaway bracket (304) that has an additional breakaway bracket (306) seated in the first breakaway bracket (304).

As further shown in FIGS. 1 and 2, the lance device (190) of the present invention is supported by a support structure (116) which comprises supporting legs (201) and a cross member beam (200). The support structure (116) can be an adjustable height and width gantry crane, whose height (H) and width (W) define an opening or passageway (210) which allows for the passage of concrete mixer truck (504) underneath the cross member beam (200) and between the supporting legs (201).

The cooling fluid source (120), fluid line (122), valve (124), and injection nozzle (112) are all as described in WO2006/100550A1, the relevant part which is incorporated herein by reference. In FIG. 1, the cooling fluid source (120) is remotely located. Alternatively, the cooling fluid source (120) may be mounted to the system (100) as shown in FIG. 2. Regardless of location, the cooling fluid source (120) is fluidly coupled to the system (100) with a fluid line (122) that allows for the cooling fluid to be supplied for injection into the concrete mixing container (502) via the rigid lance (102). In the particular embodiment noted, the cooling fluid source (120) can be turned off and on using a valve (124) attached to the vertical member support (110). While the valve (124) is shown located adjacent to the vertical member support (110), it should be appreciated that the valve (124) can be located anywhere between the cooling fluid source (120) and the fluid exit end (102B) or injection nozzle (112) of the rigid lance (102) so long as the cooling fluid is supplied for injection into the concrete mixing container (502). In addition, the system (100) noted in FIGS. 1 and 2 also includes an electronic controller (118) which is capable of sending our and receiving signals. Accordingly, it is possible for the electronic controller (118) to send out a signal to the valve (124) which will allow the valve (124) to be opened when it is time to inject the cooling fluid and a separate signal to the valve (124) which will allow the valve (124) to be closed when the injection process is completed.

As noted previously, the rigid lance (102) may also include an injection nozzle (112) for releasing the cooling fluid. The injection nozzle (112) projects from the lance at an angle Θ). In one embodiment, the angle Θ is approximately a 22° angle from the plane of the rigid lance (102). The angle Θ allows the cooling fluid to enter the concrete mixing container (502) in a direction that prevents contact and damage to the container walls. In alternative embodiments, the injection nozzle (112) is either not present or is detachable to allow for injection nozzles (112) of different angles and sizes to be quickly attached as is appropriate for a particular application. The cooling fluid utilized may be any type known in the art such as liquid nitrogen, argon, or chilled water.

The lance device of the present invention is attached to the cross member beam (200) of the support structure (116) utilizing a mounting bracket (314) as shown in FIGS. 3 and 3a. As previously noted, the mounting bracket (314) can utilize the lower end (110B) of the vertical support member (110) as a portion of the mounting bracket (314). In the embodiment set forth in FIG. 6, the mounting bracket (314) comprises a mounting bracket submember 314B) that is bolted or welded to the vertical support member (110). The mounting bracket member (314C) and mounting bracket submember (314A) are bolted or welded together. The two submembers are attached in such a manner as to provide a passage between the two submembers (314A and 314B). The mounting bracket may further include one or more sets (a total of two to eight) of roller bearings (312) as shown in FIG. 4 which also aid in the stabilization of the lance device (190) on the cross member beam (200) as well as help in moving the lance device (190) across the cross member beam (200) when necessary. An alternative mounting bracket (314) configuration would exclude the cross members (314A and 314B) and bolt the mounting bracket (314C) directly to the vertical member (110).

In addition, a means for bi-directional lateral movement (206) as shown in FIG. 2 is optionally included to further align the rigid lance (102) with the concrete mixing container (502). In this particular embodiment, this is accomplished by a means that comprises a cross beam actuator (202) which pushes and pulls the lance device (190) along the cross member beam (200). This is aided by the use of two or more roller bearings (312) in the mounting bracket (314) as mentioned above or through the use of a low friction guide placed along the cross member beam (200) (low friction guide not shown). The lance device (190) can be attached to gantry crane beams of various sizes by increasing or decreasing the distance between the mounting bracket in FIG. 4 and the vertical support member (110). The actuator (202) is attached to the cross member beam (200) on its fixed end with a means consisting of one or more beam clamps and actuator support frame (not shown).

Figure 9:
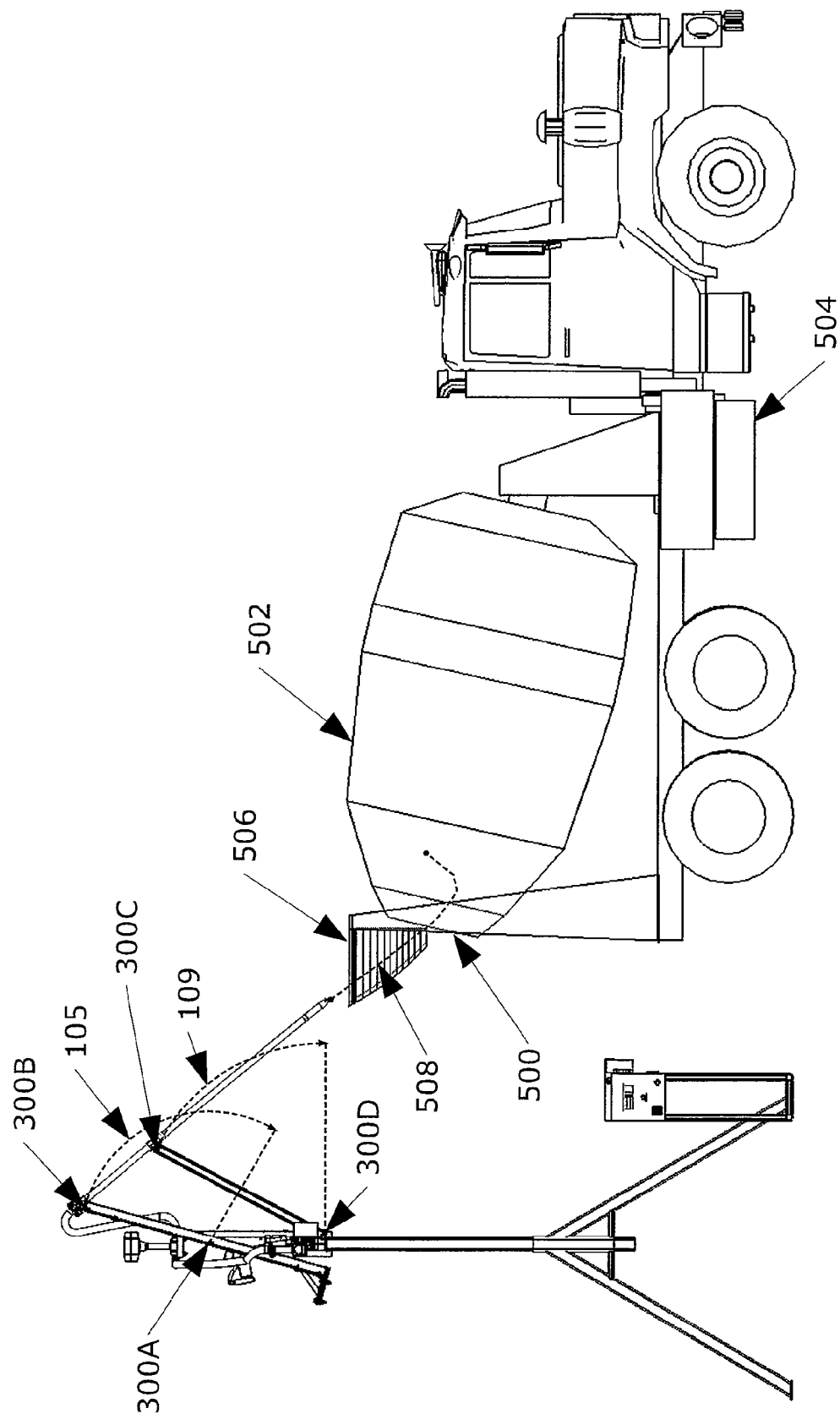
FIG. 9 illustrates one embodiment of the present invention which includes the position of the injection system, including the path of the rigid lance, with regard to injecting a cooling fluid into a container such as the concrete mixer of a concrete truck.
Figure 10:
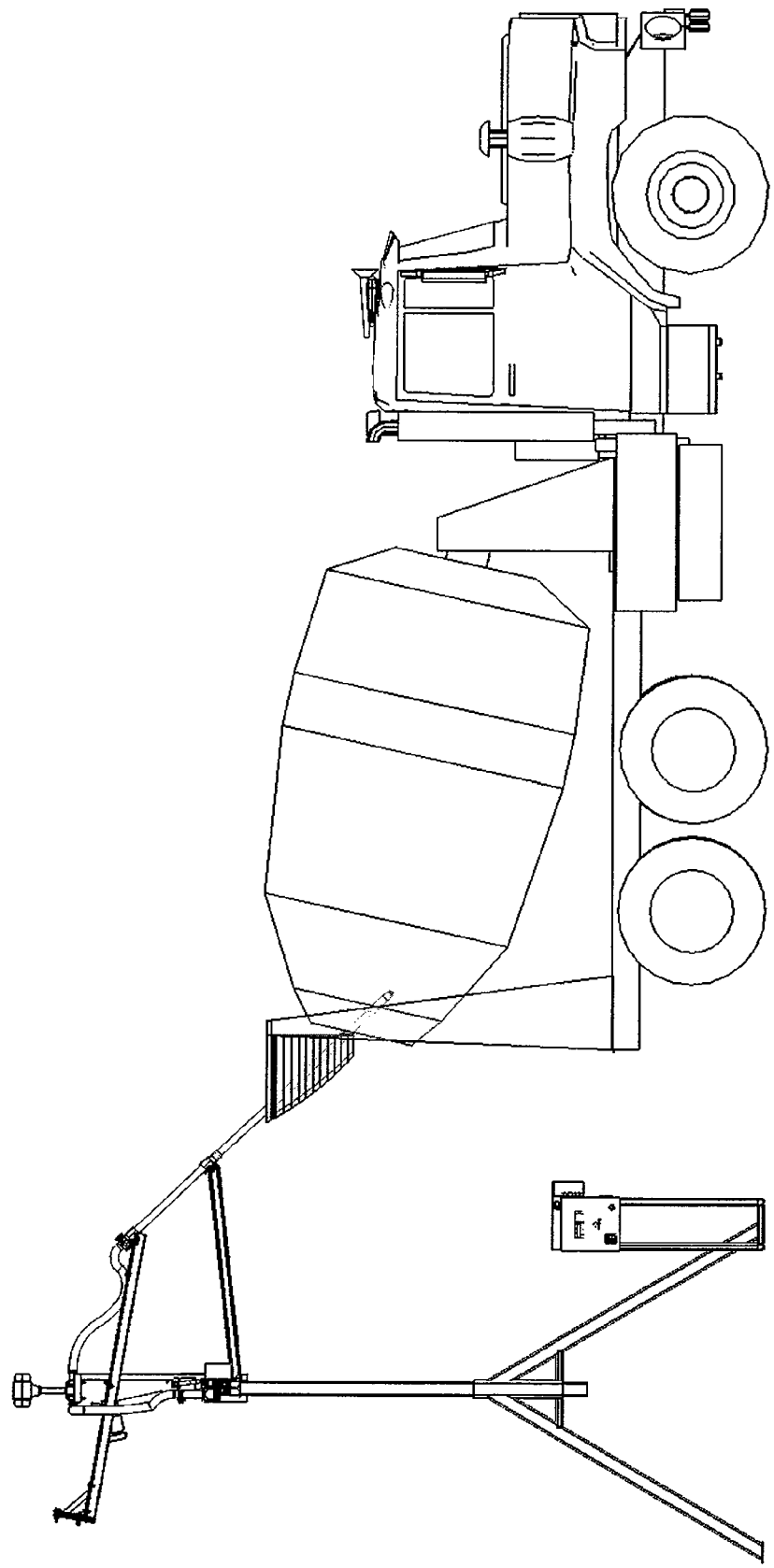
FIG. 10 illustrates one embodiment of the present invention which shows the positioning of the rigid lance at a typical insertion point into the concrete mixing container.

As further shown in FIG. 9, the path (508) depicts the start position of the fluid exit end (102B) (or injection nozzle (112)) of the rigid lance (102) and its range of motion as it enters the concrete mixing container (502). Note that the rotation of the pivots (300A and 300D) are clearly noted by the resulting arcs (105 and 109, respectively) as the rigid lance (102) travels along the path (508). When the rigid lance (102) is near its fully inserted position, the rigid lance (102) experiences the greatest variation in angle of the rigid lance (102). In the preferred embodiment, when the desired angle is reached, the electronic controller (118) will signal the actuator (302) to stop and the injection process will begin. The electronic controller (118) may be used to signal the opening of the valve (124) which allows for the injection of the cooling fluid. The rigid lance (102) angle's range is about 25 degrees to about 60 degrees from the horizontal axis, preferably from about 30 degrees to about 55 degrees from the horizontal axis (the X axis).

An alternative means to set the angle of lance is to adjust the position of the limit switches (not shown) located in the actuator (302). This method, however, requires more manual intervention in case insertion point adjustments are required once the system (100) is installed.

In addition to the rigid lance (102) angle, cooling time is also a parameter. Depending on drum size or product being cooled, different cooling times may be required. The operator thus has the ability to set the time that the valve (124) is open during the injection process. As noted previously, temperature sensors (not shown) may also be included on the walls of the concrete mixing container (502) or the tip of the rigid lance (102).

If the rigid lance (102) cannot retract (due to a power outage, failed actuator, etc.) and is in the inserted position in the concrete mixing container (502), then the concrete mixing truck 504 can pull forward and exert force "F1" to the rigid lance (102) without damaging the rigid lance (102) (see FIGS. 8 and 8A). As provided for with regard to the First Embodiment and the Second Embodiment, the rigid lance (102) rotates counter clockwise as it exits the hopper (506), the upper lifting arm (104) will rotate clockwise and exert force "F2" on the actuator (302) (see FIG. 8a). The actuator (302) will then rotate the breakaway bracket (304) clockwise to allow the rigid lance's (102) motion. The breakaway bracket (304) pushes on a second breakaway bracket (306) which is spring loaded (308) and will return the actuator (302) to its original position once the rigid lance (102) is free of the truck hopper (506) (see First Embodiment and Second Embodiment). With regard to FIG. 8, the upper lifting arm remains fixed. Therefore, the force "F2" is exerted upon the breakaway bracket of the lower guide arm (see Third Embodiment and Fourth Embodiment). The lower guide arm (108) will pull the breakaway bracket (304) away from the vertical support member (110) at the pivot (304A). A spring is connected to the breakaway bracket (304) to assist the return of the breakaway bracket (304) to its seated position once the rigid lance (102) clears the concrete mixer truck's (504) hopper (506).

An alternative mechanism allowing the truck (504) to depart while the rigid lance (102) is inserted is envisioned to be part of an additional arm (not shown) connecting pivots (300B and 300C) to which the rigid lance (102) is attached with a spring loaded linkage. As the truck departs, the rigid lance (102) would separate from the articulated arm as allowed by the linkage until the rigid lance (102) is free of the truck's hopper (506). The spring of the linkage would then return the rigid lance (102) to its original position.

For the First and Second Embodiments, if the rigid lance (102) should come in contact with any part of the concrete mixing container (502) or hopper (506) during the insertion process and experience a force which restricts its motion, the actuator (302) will rotate bracket (304) counter-clockwise away from bracket (306) (see FIG. 6A). This separation will trigger a switch of the controller (118) to reverse the actuator's motion (retract) so that the truck (504) or lance device (190) can be repositioned. The alternative mechanism mentioned above would allow the rigid lance (102) to separate from the arm (not shown) in case the rigid lance (102) motion is obstructed. This separation would trigger a switch of the electronic controller (118), which would initiate the retraction process so that the truck (504) and/or lance device (190) can be correctly positioned.

It is also envisioned that a current sensing switch or transducer (not shown) be implemented to trigger the retraction process in case the lance meets an obstruction. The switch or controller would sense the higher load on actuator (302) and signal controller (118) to withdraw the rigid lance (102) from the concrete mixing container (502).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A system (100) for injecting cooling fluid into a concrete mixing container (502), the system (100) comprising:
   A) a support structure (116) comprising:
      a) a leg assembly having two or more supporting legs (201); and
      b) a cross member beam (200) supported between the two or more legs (201);
      the two or more legs (201) and the cross member beam (200) being positioned with respect to one another in such a manner as to define a passageway (210) of sufficient height (H) and width (W) between the two or more legs (201) and beneath the cross member beam (200) to allow passage of a concrete mixer truck (504) through the passageway (210); and B) a lance device (190) positioned on the cross member beam (200) of the support structure (116), the lance device (190) comprising:
  a) an articulated arm that includes a rigid lance (102) which allows for the flow of a cooling fluid there through; and
  b) a means for acting on the articulated arm to cause pivotal movement of the articulated arm in a non-linear motion thereby controlling the angle of the rigid lance (102) while at the same time controlling the insertion and retraction movement of the rigid lance (102) into the concrete mixing container (502) for fluid injection of the cooling fluid into the concrete mixing container (502);
  wherein the rigid lance (102) of the articulated arm has a fluid receiving end (102A), a fluid exit end (102B), a fluid path in the form of a tube that extends from the fluid receiving end (102A) to the fluid exit end (102B) and allows for the flow of a cooling fluid there through, wherein when the cooling fluid is injected into the fluid receiving end (102A) of the rigid lance 102 the cooling fluid flows along the fluid path of the rigid lance (102) and into the concrete mixing container (502) through the fluid exit end (102B);
wherein the components that comprise the articulated arm include the rigid lance (102) in combination with:
  a) an upper lifting arm (104) having a first end (104A) and a second end (104B);
  b) a lower slide arm (108) having a first end (108A) and a second end (108B); and
  c) a vertical support member (110) having an upper end (110A) and a lower end (110B); and
wherein the fluid receiving end (102A) of the rigid lance (102) is pivotally connected to the second end (104B) of the upper lifting arm (104), the upper lifting arm (104) is further pivotally connected to the upper end (110A) of the vertical support member (110) at a point between the first end (104A) of the upper lifting arm (104) and the second end (104A) of the upper lifting arm (104), the second end (108B) of the lower guide arm (108) is pivotally connected to the rigid lance (102) at a point between the fluid exit end (102b) of the rigid lance (102) and the pivotal connection of the rigid lance (102) to the upper lifting arm (104), and the first end (108A) of the lower guide arm (108) is connected either directly or indirectly to the vertical support member (110) in a manner selected from:
  i) the first end (108A) of the lower guide arm (108) is pivotally connected directly to the vertical support member (110);
  ii) the first end (108A) of the lower guide arm (108) is pivotally connected at one or more points along a mounting bracket (314) that is attached at one or more different points to the lower end (110B) of the vertical support member (110);
  iii) the first end (108A) of the lower guide arm (108) is pivotally connected at one or more points along a breakaway bracket (304) that is further pivotally connected at one or more different points along the breakaway bracket (304) to the lower end (110B) of the vertical support member (110); and
  iv) the first end (108A) of the lower guide arm (108) is pivotally connected to at one or more points along a first breakaway bracket (304) that is further pivotally connected at one or more different points along a mounting bracket (314) that is positioned between the breakaway bracket (304) and the vertical support member (110).

2. The system of claim 1, wherein the means for acting on the articulated arm is selected from an electric actuator (302) and an electronic motor.

3. The system of claim 2, wherein in the articulated arm, the first end (108A) of the lower guide arm (108) is pivotally connected at one or more points along a breakaway bracket (304) that is further pivotally connected at one or more different points along the breakaway bracket (304) to the lower end (110B) of the vertical support member (110) and wherein the breakaway bracket (304) further includes a spring (308).

4. The system of claim 3, wherein one end of the actuator (302) is attached to the vertical support member (110) between the lower end (110B) of the vertical support member (110) and the point (300A) where the vertical support member (110) is pivotally connected to the upper lifting arm (104) and the other end of the actuator (302) is attached to the upper lifting arm (104) at a point (300A) between where the upper lifting arm (104) is connected to the vertical support member (110) and the first end (104A) of the upper lifting arm (104), such that when the shaft of the actuator (302) is extended or retracted, actuation of the upper lifting arm (104) causes the pivotal movements of the components of the articulated arm in a non-linear motion thereby controlling the angle of the rigid lance (102) while at the same time controlling the insertion and retraction movement of the rigid lance (102) into the concrete mixing container (502) for injection of the cooling fluid into the concrete mixing container (502).

5. The system of claim 4, wherein the actuator (302) is located on the external surface of the vertical support member (110).

6. The system of claim 5, wherein the lance device (190) further comprises a mounting bracket (314) for attaching the lance device (190) to the cross member beam (200) of the support structure (116), the mounting bracket (314) formed by joining the external surface of the lower end (110B) of the vertical support member (110) to a mounting bracket member (314C) to form a passage between the vertical support member (110) and the mounting bracket member (314C) in which the cross member beam (200) is at least partially positioned.

7. The system of claim 6, wherein the mounting bracket (314) further comprises a first mounting bracket submember (314A) attached to the mounting bracket member (314C) and a second mounting bracket submember (314B) attached to the vertical support member (110) in such a manner as to define a passage between the first mounting bracket submember (314A) and the second mounting bracket submember (314B) in which the cross member beam (200) is at least partially positioned.

8. The system of claim 3, wherein actuation of the upper lifting arm (104) is assisted by a counterweight (106) that is attached at or near the first end (104A) of the upper lifting arm (104) to counter-balance and minimize the load and required capacity of the electric actuator (302).

9. The system of claim 8, wherein the system further comprises an electronic controller (118) configured to issue and receive command signals to actuate the lance device (190).

10. The system of claim 9, wherein the electronic controller (118) is programmed with a cooling fluid injection sequence which, when executed, orients the rigid lance (102) relative to an opening of the concrete mixing container (502) and inserts at least the injection nozzle (112) of the rigid lance (102) into the concrete mixing container (502).

11. The system of claim 9, wherein the rigid lance (102) further comprises one or more sensors to send signals to the electronic controller (118) when the rigid lance (102) encounters an obstacle.

12. The system of claim 1, wherein the lance device (190) is moveably mounted on the cross member beam of the support structure and further comprises a means to allow for bi-directional lateral movement of the lance device (190) along the cross member beam.

13. The system of claim 1, wherein the rigid lance (102) is pivotally attached to the upper lifting arm (104) and the lower guide arm (108) with lance pivoting brackets (310).

14. The system of claim 1, wherein the angle of the rigid lance (102) ranges from 30 to 55 degrees from the horizontal axis.

15. The system of claim 1, wherein the support structure comprises a cross member beam (200) and two legs (201).

16. The system of claim 1, wherein the cooling fluid is a cryogenic fluid.

17. The system of claim 16, wherein the cryogenic fluid is selected from argon and nitrogen.

18. The system of claim 2, wherein the first end (108A) of the lower guide arm (108) is pivotally connected directly to the lower end (110B) of the vertical support member (110) and the means for acting on the articulated arm comprises an electric actuator (302) having a shaft that is capable of extending and retracting wherein one end of the actuator (302) is attached to the vertical support member (110) between the lower end (110B) of the vertical support member (110) and the point (300A) where the vertical support member (110) is pivotally connected to the upper lifting arm (104) and the other end of the actuator (302) is attached to the upper lifting arm (104) at a point (300A) between where the upper lifting arm (104) is connected to the vertical support member (110) and the first end (104A) of the upper lifting arm (104), such that when the shaft of the actuator (302) is extended or retracted, actuation of the upper lifting arm (104) causes the pivotal movements of the components of the articulated arm in a non-linear motion thereby controlling the angle of the rigid lance (102) while at the same time controlling the insertion and retraction movement of the rigid lance (102) into the concrete mixing container (502) for injection of the cooling fluid into the concrete mixing container (502).

19. The system of claim 18, wherein the lance device (190) further comprises a mounting bracket (314) for attaching the lance device (190) to the cross member beam (200) of the support structure (116), the mounting bracket (314) formed by joining the external surface of the lower end (110B) of the vertical support member (110) to a mounting bracket member (314C) to form a passage between the vertical support member (110) and the mounting bracket member (314C) in which the cross member beam (200) is at least partially positioned.

20. The system of claim 2, wherein the first end (108A) of the lower guide arm (108) is pivotally connected at one or more points along a mounting bracket (314) that is rigidly attached at one or more different points to the lower end (110B) of the vertical support member (110) and the means for acting on the articulated arm comprises an electric actuator (302) having a shaft that is capable of extending and retracting wherein one end of the actuator (302) is attached to the vertical support member (110) between the lower end (110B) of the vertical support member (110) and the point (300A) where the vertical support member (110) is pivotally connected to the upper lifting arm (104) and the other end of the actuator (302) is attached to the upper lifting arm (104) at a point (300A) between where the upper lifting arm (104) is connected to the vertical support member (110) and the upper lifting arm (104) is attached to the rigid lance (102), such that when the shaft of the actuator (302) is extended or retracted, actuation of the upper lifting arm (104) causes the pivotal movements of the components of the articulated arm in a non-linear motion thereby controlling the angle of the rigid lance (102) while at the same time controlling the insertion and retraction movement of the rigid lance (102) into the concrete mixing container (502) for injection of the cooling fluid into the concrete mixing container (502).

21. The system of claim 20, wherein the lance device (110) further comprises a breakaway bracket (304) that is positioned between the vertical support member (110) and the end of the actuator (302) attached to the vertical support member (110).

22. The system of claim 2, wherein the first end (108A) of the lower guide arm (108) is pivotally connected at one or more points along a breakaway bracket (304) that is further pivotally connected at one or more different points along a mounting bracket (314) that is positioned between the breakaway bracket (304) and the vertical support member (110) and the means for acting on the articulated arm comprises an electric actuator (302) having a shaft that is capable of extending and retracting wherein one end of the actuator (302) is attached to the vertical support member (110) between the lower end (110B) of the vertical support member (110) and the point (300A) where the vertical support member (110) is pivotally connected to the upper lifting arm (104) and the other end of the actuator (302) is attached to the upper lifting arm (104) at a point (300A) between where the upper lifting arm (104) is connected to the vertical support member (110) and the upper lifting arm (104) is attached to the rigid lance (102), such that when the shaft of the actuator (302) is extended or retracted, actuation of the upper lifting arm (104) causes the pivotal movements of the components of the articulated arm in a non-linear motion thereby controlling the angle of the rigid lance (102) while at the same time controlling the insertion and retraction movement of the rigid lance (102) into the concrete mixing container (502) for injection of the cooling fluid into the concrete mixing container (502).

* * * * *